United States Patent
Pung et al.

(10) Patent No.: US 7,489,707 B2
(45) Date of Patent: Feb. 10, 2009

(54) SYSTEM AND METHOD FOR A DYNAMIC PROTOCOL FRAMEWORK

(75) Inventors: Hung Keng Pung, Singapore (SG); Liming An, Singapore (SG)

(73) Assignee: National University of Singapore, Singapore (SG)

( * ) Notice: Subject to any disclaimer, the term of this patent is extended or adjusted under 35 U.S.C. 154(b) by 458 days.

(21) Appl. No.: 10/966,844

(22) Filed: Oct. 15, 2004

(65) Prior Publication Data

US 2005/0238050 A1   Oct. 27, 2005

Related U.S. Application Data

(60) Provisional application No. 60/511,330, filed on Oct. 16, 2003.

(51) Int. Cl.
*H04J 3/22* (2006.01)
(52) U.S. Cl. .............. 370/469; 370/466; 709/250; 709/230
(58) Field of Classification Search ............ 370/469, 370/466; 709/230, 250
See application file for complete search history.

(56) References Cited

U.S. PATENT DOCUMENTS

| | | | |
|---|---|---|---|
| 5,515,508 A * | 5/1996 | Pettus et al. ............ | 709/203 |
| 5,548,723 A | 8/1996 | Pettus | |
| 5,594,921 A | 1/1997 | Pettus | |
| 5,903,754 A * | 5/1999 | Pearson ............... | 719/310 |
| 7,089,318 B2 * | 8/2006 | Krishnaswamy et al. .... | 709/230 |
| 2003/0174731 A1 * | 9/2003 | Tafazolli et al. ........... | 370/469 |
| 2004/0139088 A1 * | 7/2004 | Mandato et al. ........... | 707/100 |

* cited by examiner

*Primary Examiner*—Ricky Ngo
*Assistant Examiner*—Dewanda Samuel
(74) *Attorney, Agent, or Firm*—Christie, Parker & Hale, LLP

(57) ABSTRACT

A dynamic protocol framework system comprising a registry containing object-oriented elements, each element corresponding to a resource protocol component available to the system; a configurator unit for building one or more candidate protocol stacks from the elements based on protocol specifications and for building and configuring a functional protocol stack from one of the candidate stacks; and a synchronization manager monitoring the building and re-configuration of protocol stacks for consistency with the protocol specifications and monitoring for compatibility and interoperability of protocol stacks of end-to-end communicating processes.

14 Claims, 19 Drawing Sheets

☐ Protocol component  ● Reflective connector
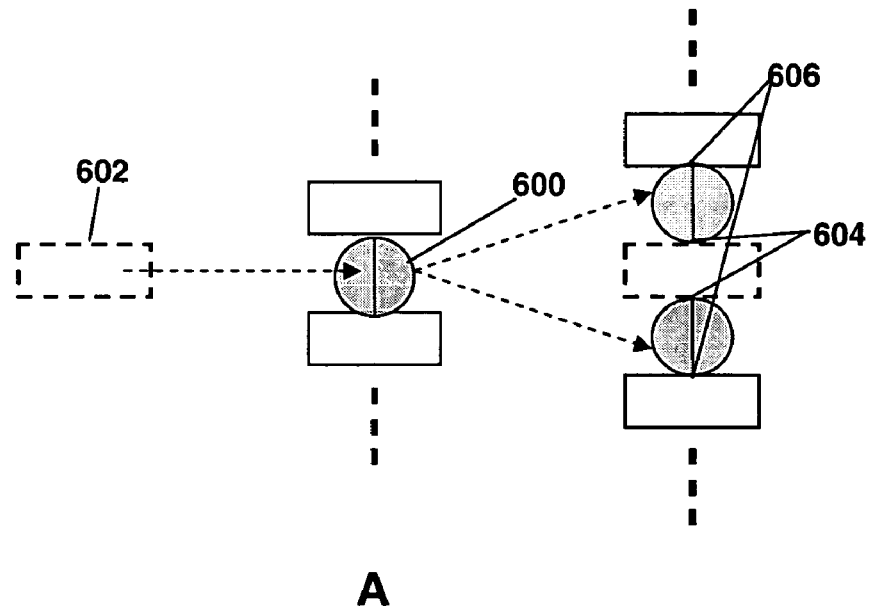
A
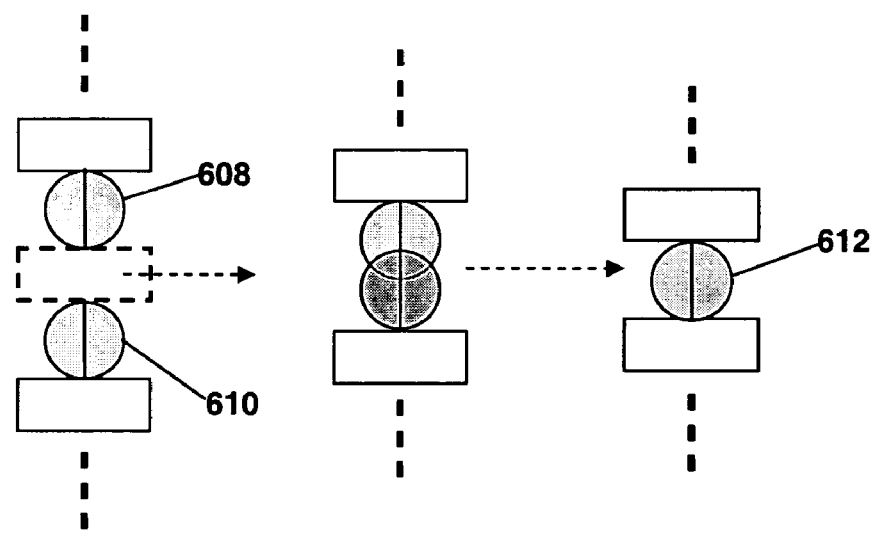
B
FIG. 6

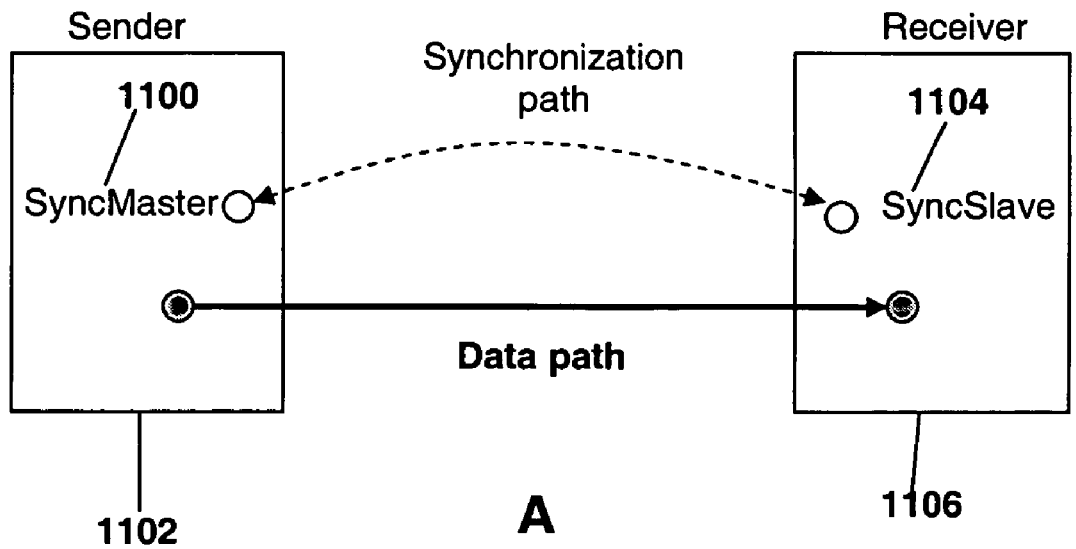
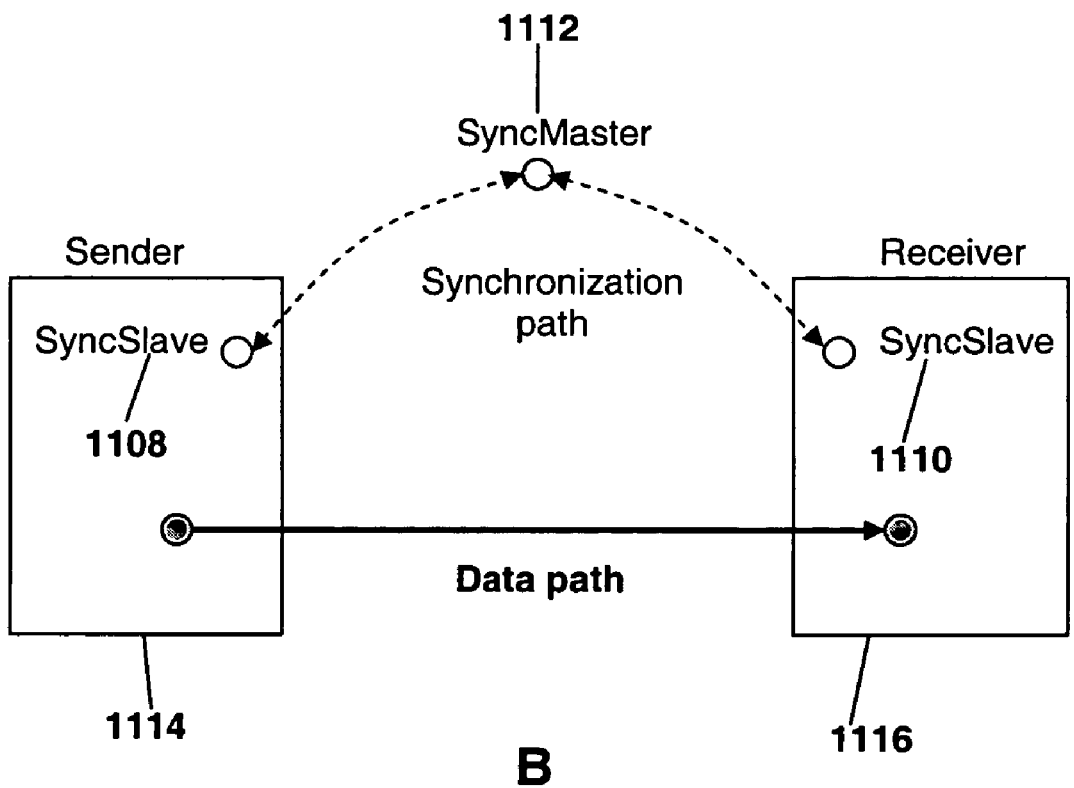
FIG. 11

| Unicast Settings | | | |
|---|---|---|---|
| | $T_{RTP}$ | $T_{DPF-B}$ | $T_{DPF-S}$ |
| Sender | 465 | 1286 | 77 |
| Receiver | 526 | 1173 | 207 |
| Multicast Settings | | | |
| Sender | 467 | 1289 | 89 |
| Receiver 1 | 516 | 1129 | 220 |
| Receiver 2 | 622 | 1413 | 206 |
| Receiver 3 | 583 | 1329 | 203 |
| Receiver 4 | 578 | 976 | 199 |

$T_{RTP}$: Time to prepare for a RTP connection by directly using JMF interfaces
$T_{DPF-B}$: Time to build a DPF stack
$T_{DPF-S}$: Time to swap codec layer in a DPF stack
* All values are in the unit of millisecond and are the mean over 30 times' measurements

FIG. 18

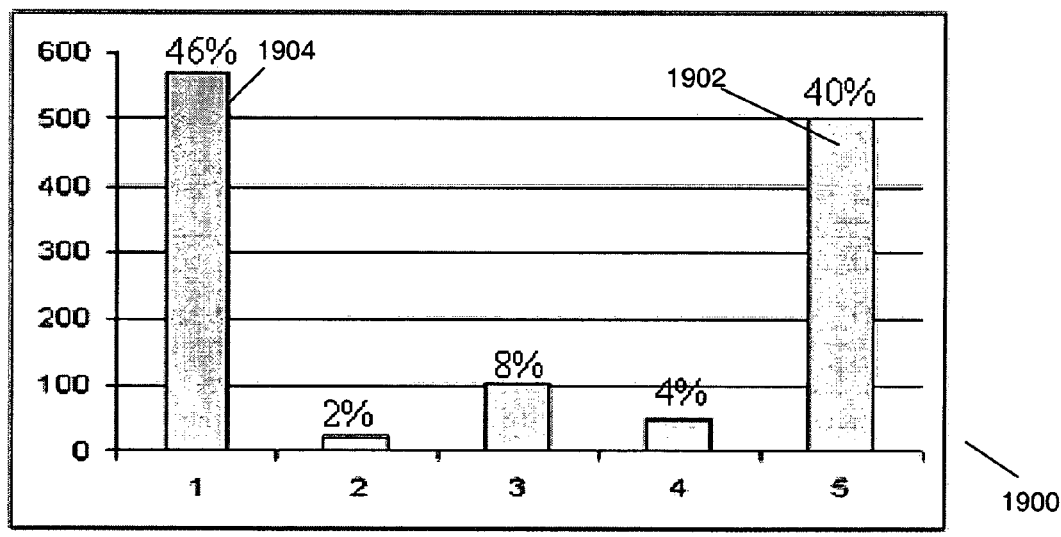

1. Time to define stack   2. Time to create stack   3. Time to build stack
4. Time to connect stack   5. Time to open stack

FIG. 19

SYSTEM AND METHOD FOR A DYNAMIC PROTOCOL FRAMEWORK

CROSS-REFERENCE TO RELATED APPLICATION

This application claims the benefit of U.S. Provisional Application No. 60/511,330, filed Oct. 16, 2003.

FIELD OF THE INVENTION

The present invention relates broadly to a dynamic protocol framework system, to a method of dynamic protocol framework configuration, and to a computer readable data storage medium having stored thereon computer code means for instructing a computer to execute a method of dynamic protocol framework configuration

BACKGROUND

Recent advances in telecommunications have brought forth the so-called digital convergence, where audio and video are being processed digitally through Internet. These emerging multimedia applications are demanding on system resources and are sensitive to runtime resource fluctuations.

However, in a network as technologically diverse as the Internet, each end node may have its own set of available system and network resources. Current Internet technology ranges from 9600-baud modems up to gigabit Ethernet with unpredictable momentary fluctuations of available resources due to network congestion or topology changes. Devices on which multimedia applications are expected to deploy present another diversity, which covers from powerful desktops or laptops to small scale personal digital assistants (PDA) or mobile phones. Since it is impossible to predict such variations at design time, adaptation is essential for optimal delivery of multimedia applications.

Traditional monolithic protocol stacks are static in nature. Firstly, application designers have to expressively specify the protocol components needed, which potentially hinders the portability of applications on different runtime platforms. Secondly, once the protocol stack is established at build time, runtime reconstruction of the stack is not allowed unless the termination and restart of current data transmission. Such static protocol stacks are surely not suitable for demanding multimedia applications over diverse runtime environments. Since the static nature of the predefined protocol stacks is limited in many ways, research of flexible protocol stacks in communication systems has been carried out in the last few years.

One such stack is an adaptive Quality of Service (QoS) framework, which offers the ability to re-configure its (protocol) components. However, the reconfiguration in this framework needs guidance from applications when violations occur since such guidance is not included in the QoS specification. As it is unlikely to anticipate all possible QoS violations at the design phase of an application, expensive software re-engineering process is needed to 'update' the QoS awareness of existing applications, including adding new codes and re-compilations of applications. The similar observation is found in a research project where components requiring control interfaces from lower layers must explicitly query for them when bound to a protocol service. Also, constraints in protocol composition have not been well defined by this framework, and it seems that a big part of the logic required for dynamic composition is dependent on component developers.

Another framework aims at the development of a customizable system (such as protocol stacks and I/O drivers). It sees such software as an aggregation of anonymously connected functional components. Components in this framework need to be completely independent of each other. The advantage is the reusability of functionality and a high degree of flexibility. However, in practice, constraints and dependencies are always present in the configuration of protocols. Furthermore, reflection points of this framework, which perform packet switching within a protocol stack, can only support runtime reconfiguration.

On the other hand, it is sometimes argued that different components of a multimedia stream (e.g., audio, video and text) have different proprieties and require different QoS treatments. It is proposed to construct optimized protocol stack for each of the media. The focus is to provide tailored protocol services to support diverse requirements of different media types.

Another proposed solution presents the design of an adaptive middleware platform, which assists application adaptation through open implementation and reflection. This solution introduces the concepts of "object graph" which offers a meta-interface to support the inspection and adaptation of the communication path. However, it only focuses on the inspection of and adaptation to QoS according to underlying network conditions.

Another system proposes "protocol building block" description and protocol selection algorithms. The description mainly comprises the properties provided by the protocol building block as well as its downward and upward dependencies. An algorithm to select building blocks is also presented where the selection is based on whether all specified features are provided and all dependencies of selected components are fulfilled. However, issues such as the protocol stacks synchronization among communication peers and the dynamic reconfiguration of the stack at runtime are not addressed.

Another system Dynamic Layered Protocol Stack (DLPS) of Microsoft, provides a method to dynamically build a protocol stack for data transfer. The protocol stack is also re-configurable by modifying the protocol layer descriptions and rebuilding the stack. DLPS has the objective to construct a dynamic and flexible protocol stack. However, the flexibility provided by DLPS is limited in many ways. Firstly, users must explicitly specify the name of the protocol they want. No other means of specification exist. Secondly, the protocol stack in DLPS is re-configurable by changing the protocol layer description and rebuilding the stack where current data transmission has to be terminated and restarted, thus resulting in transmission interruption Finally, there is no assurance for compatibility of protocol stacks in DLPS.

Hence, it was with knowledge of the foregoing concerns that the present invention was conceived and has now been reduced to practice.

SUMMARY

In accordance with a first aspect of the present invention there is provided a dynamic protocol framework system comprising a registry containing object-oriented elements, each element corresponding to a resource protocol component available to the system; a configurator unit for building one or more candidate protocol stacks from the elements based on protocol specifications and for building and configuring a functional protocol stack from one of the candidate stacks; and a synchronization manager monitoring the building and re-configuration of protocol stacks for consistency with the protocol specifications and monitoring for compatibility and interoperability of protocol stacks of end-to-end communicating processes.

The system may comprise a parser unit for interpreting the protocol specifications and creating protocol stack specifications based on the protocol specifications, and the elements for the building of the candidate protocol stacks by the configurator unit are selected based on matching requirements in each layer of the protocol stack specifications.

The configurator may build a layered network of selected elements from the registry, the layered network comprising protocol graphs interconnecting the elements of different layers, and the candidate protocol stacks are derived from the protocol graphs in stages The deduction of the candidate stacks from the protocol graphs may comprise prioritising the elements in the respective layers of the layered network.

The protocol graphs may reflect dependencies between the elements, and the deduction comprises selecting valid dependencies between elements.

The configurator may select the candidate protocol stack for building and configuring the functional protocol stack based on synchronising sender and receiver available functional protocol stack.

The protocol components in the functional protocol stack may be interconnected via reconfigurable connector elements.

Each connector element may be reconfigurable to enable cloning and merging of connector elements.

Each connector element may clone itself by maintaining existing connections to protocol components on its outer end, splitting itself into two connector elements, and binds the inner ends of the two connector elements to a new protocol component.

Two connector elements may merge by maintaining respective existing connections to protocol components on their respective outer ends, by disconnecting their respective connections on their respective inner ends to the same inner protocol component, and merging into one connector element.

Each connector element may be arranged to enable swapping of a protocol component to which it is connected.

Each connector element may establish a connection to a new protocol component, while maintaining its active connection to an old protocol component, and disconnecting the connection to the old protocol components at an appropriate instance with respect to the activation of the connection to the new protocol component.

The system may be arranged such that the registry is maintained utilising auto-discovery of the available protocol resources.

Each object-oriented element may comprise associated data representing one or more of a group consisting of the name of the corresponding protocol component, properties of the corresponding protocol component, supported format of the corresponding protocol component, and the propriety of the corresponding protocol component.

Search criteria for building the candidate protocol stacks may comprise keywords for matching with the associated data of the respective object-oriented elements.

The configurator unit may be arranged for protocol stack specification during the coding of applications, for configuration of protocol stacks during the communication connections setup, and for on-the-fly reconfiguration of protocol stacks including adding, removing and swapping of protocol components.

The protocol stack may comprise a non-linear protocol stack for optimizing duplicated processing and/or for combining multiple linear protocol stacks and sharing protocol components in multicast processes.

In accordance with a second aspect of the present invention there is provided a method of dynamic protocol framework configuration, the method comprising maintaining a registry containing object-oriented elements, each element corresponding to a resource protocol component available to the system; building one or more candidate protocol stacks from the elements based on protocol specifications and for building and configuring a functional protocol stack from one of the candidate stacks; monitoring the building and re-configuration of protocol stacks for consistency with the protocol specifications; and monitoring for compatibility and interoperability of protocol stacks of end-to-end communicating processes.

The method may comprise protocol stack specification during the coding of applications, configuration of protocol stacks during the communication connections setup, and on-the-fly reconfiguration of protocol stacks including adding, removing and swapping of protocol components.

The protocol stack may comprise a non-linear protocol stack for optimizing duplicated processing and/or for combining multiple linear protocol stack and sharing protocol components in multicast processes.

In accordance with a third aspect of the present invention there is provided a computer readable data storage medium having stored thereon computer code means for instructing a computer to execute a method of dynamic protocol framework configuration, the method comprising maintaining a registry containing object-oriented elements, each element corresponding to a resource protocol component available to the system; building one or more candidate protocol stacks from the elements based on protocol specifications and for building and configuring a functional protocol stack from one of the candidate stacks; monitoring the building and re-configuration of protocol stacks for consistency with the protocol specifications; and monitoring for compatibility and interoperability of protocol stacks of end-to-end communicating processes.

BRIEF DESCRIPTION OF THE DRAWINGS

Embodiments of the invention will be better understood and readily apparent to one of ordinary skill in the art from the following written description, by way of example only and in conjunction with the drawings, in which:

FIGS. 6A and 6B show the cloning and merging operations of a Reflective Connector component of the Dynamic Protocol Framework described in the example embodiment respectively.

FIG. 11 shows the relationship and interaction between Synchronization Slaves (SyncSlaves) and Synchronization Masters (SyncMaster) of the Dynamic Protocol Framework described in the example embodiment for remote parameters of protocol stacks.

FIG. 18 shows the time taken for performing various sub-tasks of the dynamic protocol framework in both the unicast and multicast settings as described in the example embodiment in comparison with that of a Real-time Transport Protocol (RTP) connection.

FIG. 19 shows the percentage of time spent in each phase of the method adopted by the Dynamic Protocol Framework described in the example embodiment.

DETAILED DESCRIPTION

Figure 1:
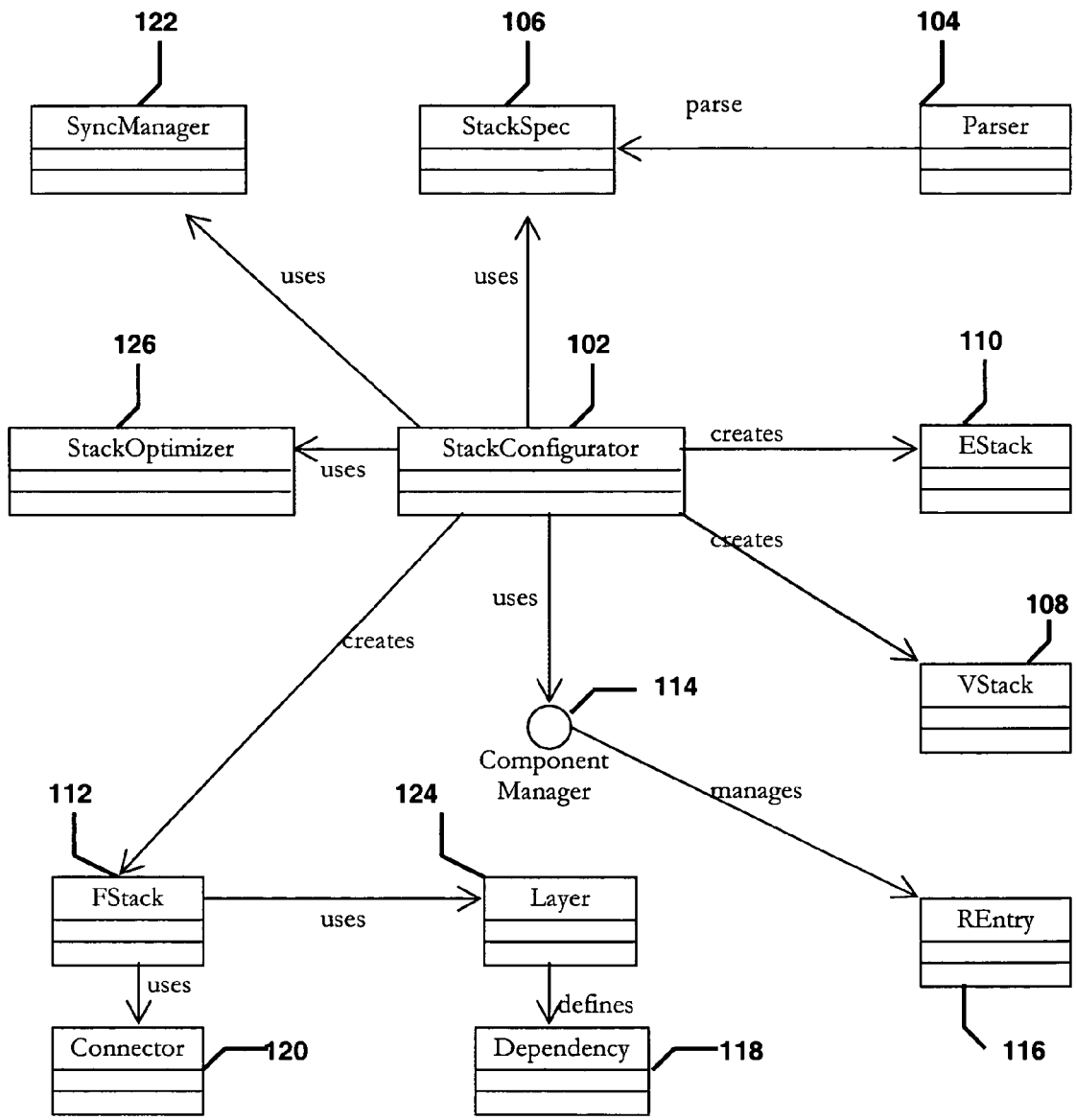
FIG. 1 shows the component modules of a Dynamic Protocol Framework described in an example embodiment.

An example embodiment of the present invention is a Dynamic Protocol Framework (DPF), that is an object-oriented component-based middleware framework providing dynamic protocol configurability support for multimedia applications. DPF offers the flexibility to build a protocol stack of dynamically loaded components that provide specific services to media flows. Design goals as well as the main functionalities provided by DPF may include Automatic discovery of protocol resources, dynamic configuration of protocol components, on-the-fly reconfiguration of protocol components and stack synchronization among communication peers.

In the example embodiment, protocol services are implemented as object-oriented components. A local registry keeps track of the protocol components available for use. These components need not be bound at design time. Their properties and behaviors (defined by the services they offer) are inspected via reflection where appropriate components are automatically discovered and loaded to build the protocol stack.

As mentioned, all protocol services in the example embodiment of the present invention are developed as components. A protocol component is a set of rules or a processing entity that governs the communication between communicating peers. In the example embodiment, all protocol components are organized in a layered structure, which together forms a protocol stack. A protocol graph is used to express the logical configuration and inter-connection of protocol components, of which at least one configuration may be suitable for the actual construction of the runtime protocol stack. The availability of possible protocol components is dynamic and made customizable to application developers. The example embodiment automatically builds the protocol stack by selecting appropriate protocol components. Protocol graph composition and configuration are based on a stack specification passed to the example embodiment. The stack specification indicates the conditions of the system environment and the requirements/preference of the application.

The example embodiment also supports on-the-fly reconfiguration of the protocol stack. The runtime reconfiguration is very useful in case of moving an application utilising a particular protocol stack to a new environment for example during communication in progress or a drastic change in an underlying network condition. For instance, in a computer network scenario, when a network congestion causes a distinct drop of bandwidth, it is preferable to change the existing higher quality codec with a lower quality codec to save bandwidth. Such change is preferably done virtually on-the-fly during the communication than to stop the transmission and restarting the system or session. Reconfiguration in the example embodiment includes reconfiguring the properties of the protocol components, adding, removing and swapping the protocol components in the stack. Another example of the "on-the-fly" feature is when a protocol component is selected to build the stack, its parameters are dynamically configured at runtime (instead of at design time) according to the stack specification. Thus, it shows that the example embodiment may provide the flexibility to build and adapt the protocol stack of these dynamically loaded components to support multimedia flows.

In addition, the protocol stack built by the example embodiment can be a traditional linear protocol graph or a non-linear protocol graph as well. In a non-linear protocol graph, there may be multiple protocol components in one layer. This non-linear protocol graph we are talking here is not for parallel processing to do load balancing. It actually represents multiple flows, which can share protocol components. Sharing protocol components is, on one hand, for optimization purpose, on the other hand, is necessary in some cases such as in multicasting operations.

With such supports, applications applying the protocol stack built by the example embodiment do not need to worry about the types of networks and system environment that it will operate in. The design of the application could be based on very generic and abstract definition of a communication system. For example, to develop a distributed multimedia application, the developer can just regard the communication system as Codec/Media aware/Transport/Network. This abstract definition of the communication system may allow the application to be able to work in various system environment such as G723 (a typical codec Standard)/RTP (Real Time Protocol)/UDP (User Datagram Protocol)/IPv4 (Internet protocol version 4) or MPEG (Moving Pictures Experts Group codec standard)/RTP/TCP (Transport Control Protocol)/IPv6 (Internet Protocol version 6).

Furthermore, the example embodiment may synchronize the protocol stacks at each communication peer to ensure the protocol stack consistency and compatibility at bind-time and runtime. The DPF approach in the example embodiment is based on a balance of adaptability, code reusability and ease of deployment. These features are directly supported by the various modules of the example embodiment as is illustrated in FIG. 1.

FIG. 1 shows a diagram 100 comprising component modules of the example embodiment. A stack configurator 102 functions as a processing centre. The stack configurator 102 comprises four main components, namely the Stack Specification (StackSpec) 106, Virtual Stack (VStack) 108, Eligible Stack (EStack) 110 and Functional Stack (FStack) 112.

One other component is the Layer 124. The 'Layer' here is not the protocol layer in the OSI 7-layer; it is an abstraction for all protocol components. In the Dynamic Protocol Framework described in the example embodiment, actual protocol components are subclasses of the Layer, which allows common properties, interfaces and processing enabling protocol configuration be defined and extended to all these protocol components. For example, 'check dependency' is a processing defined in Layer that enables the checking of dependency of a protocol component. All layers built by the example embodiment form a protocol graph.

Another component is the Dependency 118 module. In general, the Dependency module 118 is defined by the Layer 124 to indicate its dependency with other protocol components.

The Connector 120 module is another component that is used by the FStack 112 for binding protocol layers and hence their protocol components together.

Another component shown is the Parser 104, which the stack configurator 102 uses to parse protocol specification data into a StackSpec object 106.

Also present is a Component Manager 114, which is used by the stack configurator 102 to select protocol components. The Component Manager 114 manages a Component Registry 116, which functions as a database. The Component Registry comprises at least one registration entry.

The Synchronisation Manager 122 shown in FIG. 1 is utilised by the stack configurator 102 to ensure the compatibility, and hence the interoperability of the protocol components when working in combination.

Elaborating further on the Dependency module, it should be noted that some protocols may be independent and some may depend on other protocols. For example, TCP must be deployed over IP and SPX (Sequenced Packet Exchange) depends on IPX (Internetwork Packet Exchange). If TCP is placed over IPX, it will result in a dependency conflict. Therefore, in the example embodiment, to ensure all components in the protocol graph can cooperate properly with each other without conflict, each protocol component must explicitly define a set of service dependencies.

Service dependencies are defined as a requirement for service in the upper or lower layers. These requirements can be defined for three directions—null, upward and downward. A null dependency defines a directionless requirement on a service. In other words, the required service may be located anywhere in a protocol graph. An upward dependency defines a service requirement on an upper layer, and likewise for downward dependencies.

Dependencies can also be categorized into two types—hard and light. A hard dependency demands for the required service to be in an immediate layer; a light dependency does not concern with the location of the required service but only its presence. For example, a hard dependency can be used to describe the relationship between a TCP layer and an IP layer where TCP can have a hard downward dependency on IP. A soft dependency can be illustrated in the case of RTP and Transport layers. RTP may have a soft downward dependency on Transport. This means that placing a flow control or error-correction layer in between RTP and Transport is possible.

Figure 2:
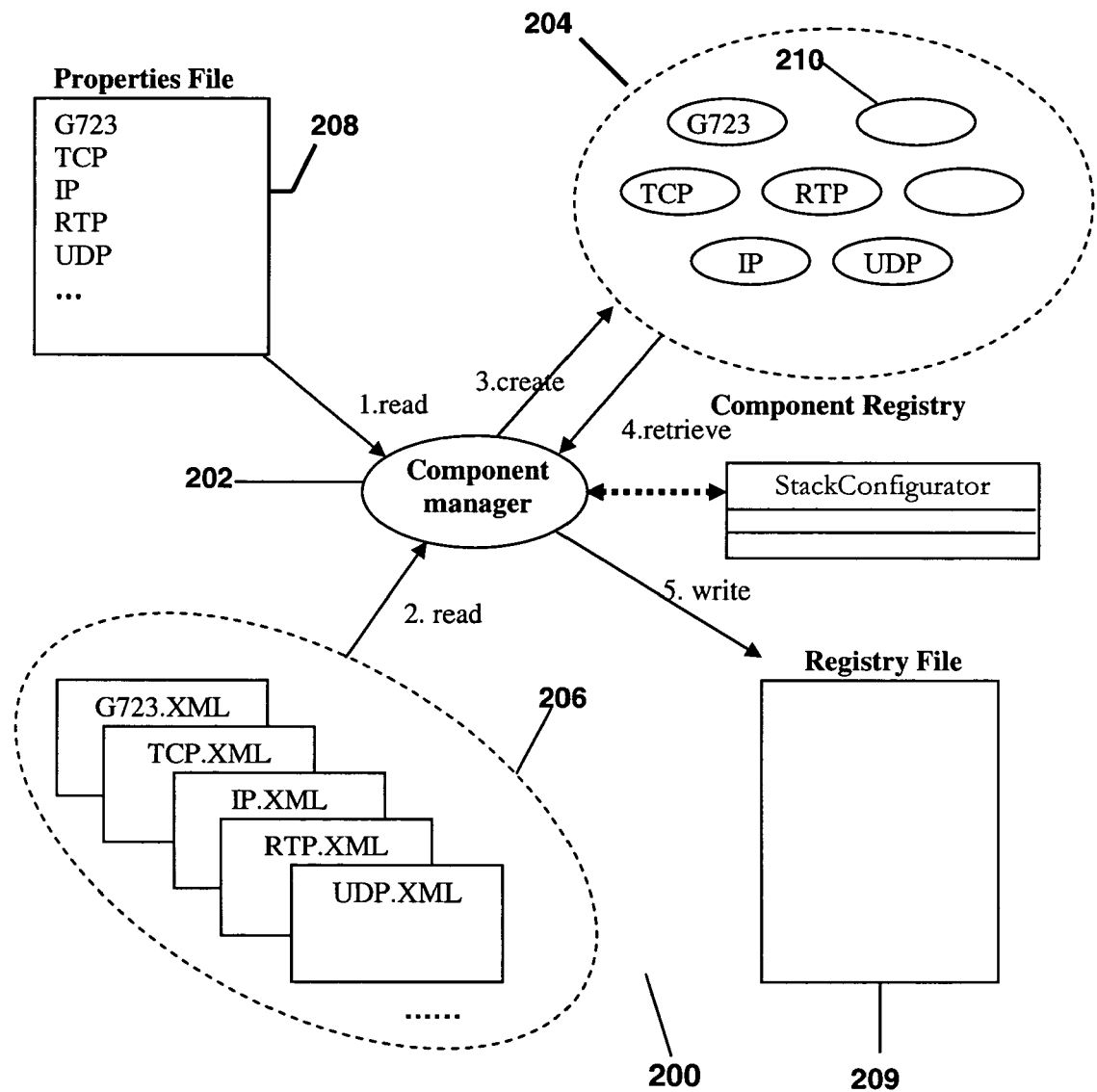
FIG. 2 shows in more detail the component manager and component registry of the Dynamic Protocol Framework described in the example embodiment.

FIG. 2 illustrates the example embodiment in detail through a data floor diagram 200 showing operations occurring between a component manager (CM) 202, a component registry 204, a stack configurator 212 and protocol component resources such as properties file 208 and extensible markup language (XML) files 206.

With reference to FIG. 2, CM 202 is essentially a factory for the maintenance and retrieval of protocol components. CM 202 maintains a local registry of protocol components that can be readily deployed into functional use. To register a protocol component in the example embodiment, the CM 202 first reads the names of all available protocol components from a Properties File 208. Then it locates the XML file 206 of each protocol component. Each XML file 206 records location of the component implementing the protocol, its behavior (services provided), and properties such as the dependencies, supported format, priority and parameters related to quality of service (QoS). This information helps the StackConfigurator 212 to discover and locate suitable components for building an appropriate protocol stack.

Next, CM 202 retrieves all these information, then creates a registration entry (Rentry 210) for each protocol component and adds it into the Component Registry 204. This Component Registry 204 is a runtime registry resided in memory; it can also be saved to a Registry File 209, so that the Component Registry can be directly loaded to memory from this Registry File when re-running DPF instead of being created again.

At the time of protocol stack configuration/re-configuration, suitable protocol components will be retrieved from the Component Registry 204. The example embodiment allows the search criteria to determine a protocol stack specification to be expressed in a flexible way, that is the name of a specific protocol may not be the only keyword to create the protocol stack at design-time. Instead, the input keywords may just describe the properties and/or propriety of the desirable protocol service. At a bind-time, appropriate protocol components will be automatically retrieved by CM 202. As an example, the input keywords may specify the requirement for "a transport component" at design-time; CM 202 will then retrieve all components that provide transport service (e.g., TCP, UDP and IPX) at bind time. The final choice in the appropriate protocol stack for practical use at a particular time instance is up to the run-time environments in the example embodiment, such as dependency checking, priority, or even the stack configuration of the peers.

CM 202 supports two kinds of keyword match retrievals in the example embodiment: fast search to find the first protocol component in Component Registry 204 that matches and full search to find all protocol components available in Component Registry 204 that match.

By working with the Component Registry 204, for example, CM 202 may support the following search requests:

1) Find all protocol components available in Component Registry 204 matching a service type or name. Examples of service types are Transport, Codec, Flow Control etc. Examples of service names are UDP, TCP, MPEG etc.

2) Find the first protocol component available in Component Registry 204 matching a service type or name.

3) Find all protocol components available in Component Registry 204 matching a layer specification. Each layer specification can contain protocol service type or name plus required protocol parameters.

As mentioned, the Component Manager 202 is essentially also a factory for protocol components. In the example embodiment, there are two ways to create a new entry 210 in Component Registry 204.

One way is before the DPF described by the example embodiment runs, the new component name is added in the Properties File 208, then a XML file 206 containing the component information is created, which is followed by deleting the old Registry File. In this case, when the DPF runs again, Component Manager 202 will automatically regenerate the Component Registry 204, which contains the REntry 210 of the new component.

Another way is during run time, directly calling the interface provided by Component Manager 202 to create a new REntry 210 and adding it to Component Registry 204. However, in this way, the new component will be lost when DPF runs again.

Figure 3:
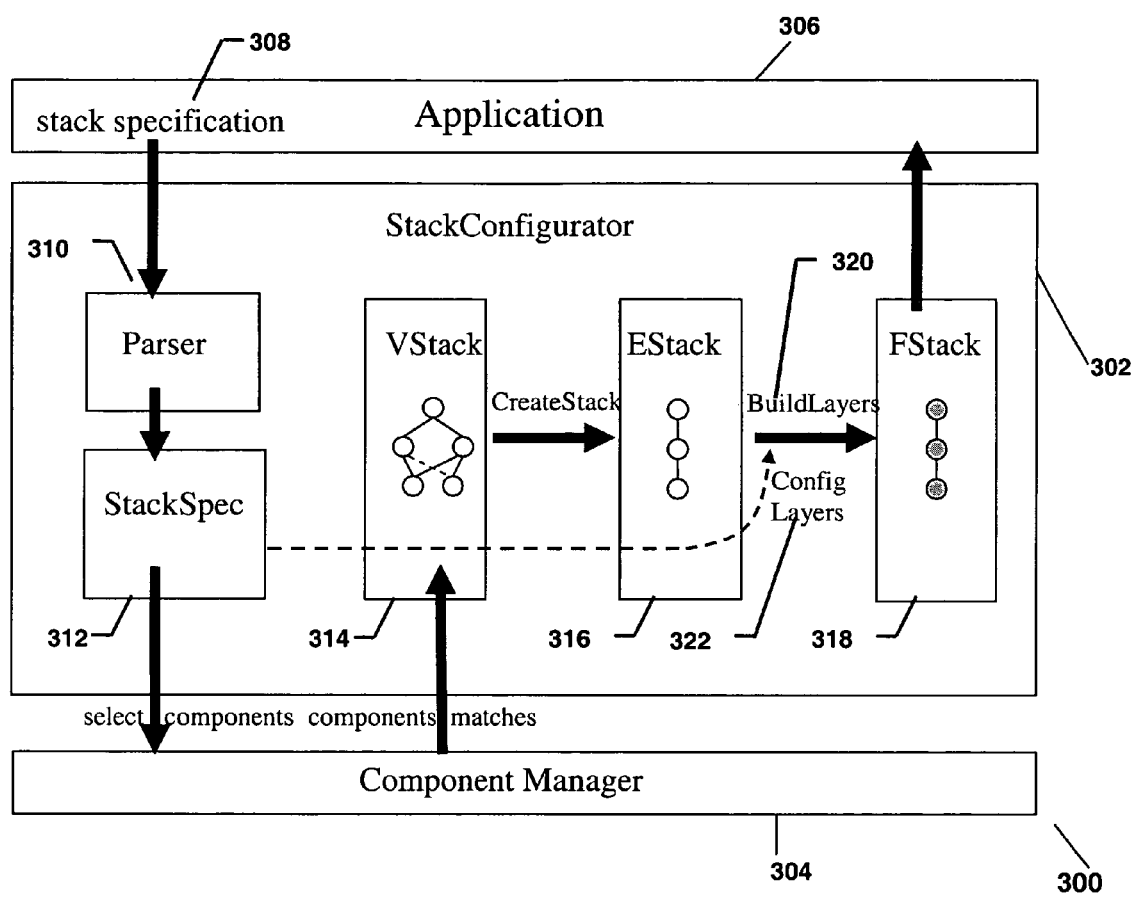
FIG. 3 shows three stages of protocol configuration and interaction of components during session setup as described in the example embodiment.

With reference to FIG. 3, in the example embodiment, the Stack Configurator 302 hides the low-level logic in building and configuring protocol stacks from the application developers. The StackConfigurator 302 supports two types of configuration of the protocol stack, namely, configuration for the session setup and on-the-fly reconfiguration during session.

There are three stages in protocol configuration during session setup—Stack specification, Protocol discovery and selection, Protocol building and configuration. This 3-stage protocol configuration is achieved by the interaction of the components in StackConfigurator 302 and ComponentManager 304.

The four main components in StackConfigurator 302 are show again as StackSpec 312, VStack 314, EStack 316, and FStack 318 in FIG. 3. The workflow of the Stack Configurator 302 in conjunction with Component Manager 304 and the application 306 receiving the input data for the step of protocol stack specification is illustrated in FIG. 3.

In the Stack specification stage, a Parser 310 parses the stack specification 308, for example translating a data string provided by the application 306 into a StackSpec object 312 which abstracts the specifications and requirements for all the communication layers required in the protocol stack. This StackSpec 312 is the overall guidance for configuration and adaptation.

In the Protocol discovery and selection stage, the StackSpec object 312 is sent to the Component Manager 304, which would then retrieve from the Component Registry (204 in FIG. 2) components (e.g. 210 in FIG. 2) that match the requirements in each layer. The result of the selection is a Virtual Stack (VStack) 314, meaning that each protocol component in VStack 314 is just a REntry instead of a real instance of the protocol component, which will consume system resources. However, all relevant information such as the name and proprieties of the functional instance are stored in this REntry and are ready to be deployed.

It is possible that for each layer, the Component Manager 304 will return several protocol components that meet the requirements. All of these components are then listed in a priority order for selection. The priorities can be specified by the application developer or the service provider, which allows the flexibility to cater requirements from different stakeholders.

Furthermore, the final result of protocol discovery does not only rely on the priorities of the candidate protocol components in the example embodiment. Sometimes the deployment of one protocol component may require the selection of another component as a prerequisite. For example TCP must be deployed over IP, whereas SPX only works with IPX. TCP cannot be built upon IPX even if both of them are of the highest priority in the respective protocol layers. To ensure that all components in the protocol graph can cooperate properly with each other, a dependency check is enforced in the example embodiment.

Figure 4:
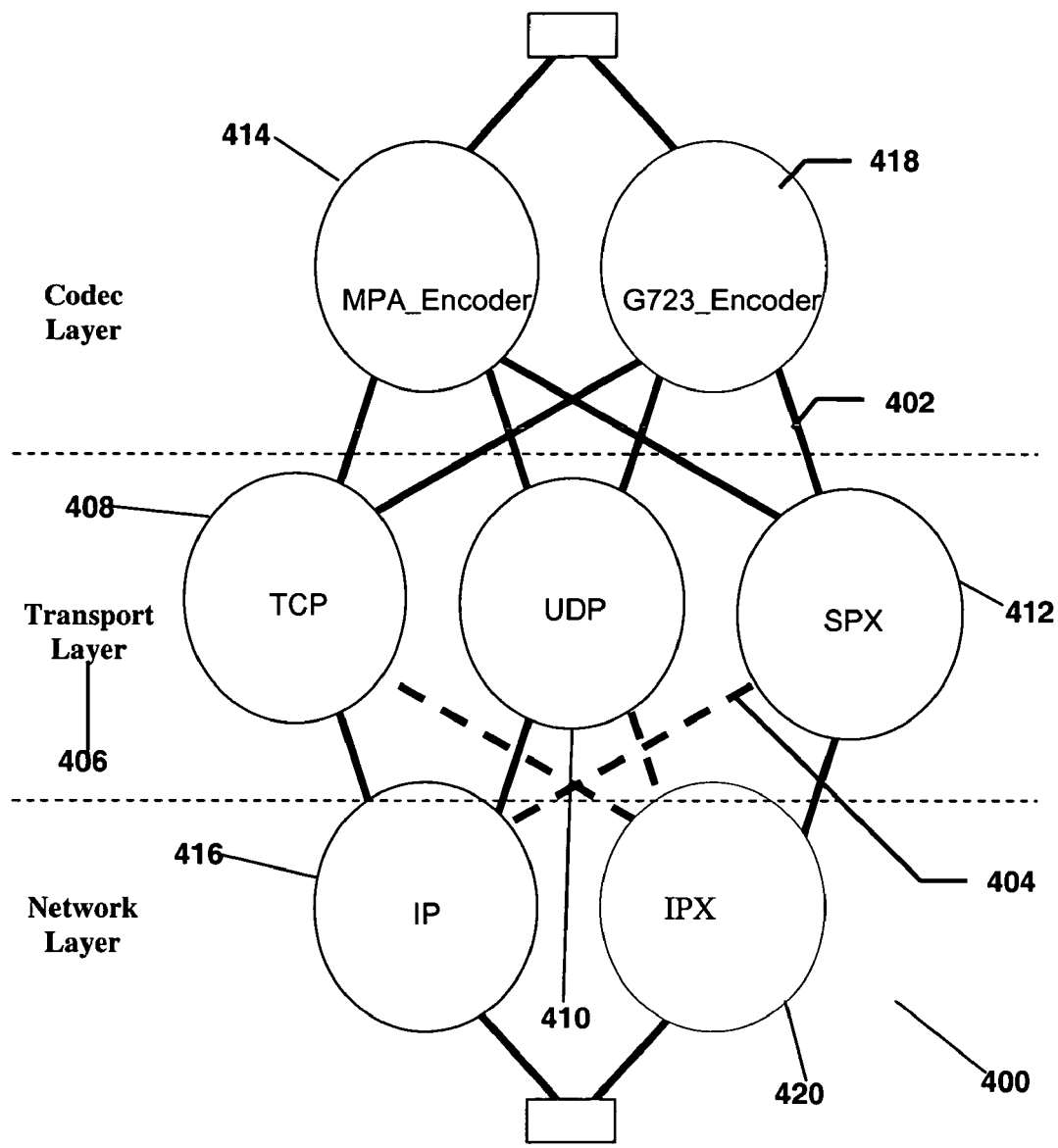
FIG. 4 shows an example of a Virtual Stack (VStack) of the Dynamic Protocol Framework described in the example embodiment.

An example of VStack 400 is showed in FIG. 4. The details of the VStack 400 are described as follow.

In FIG. 4, the solid lines 402 are valid dependencies, while the dashed lines 404 indicate dependency-conflicts. Furthermore, we can see in one layer, there may be more than one components being selected, because they all meet the requirements of this layer. All of these components are listed in a left-to-right order according to their priority specified by the application developer or the service provider. The VStack 400 composed of candidate protocol components where the leftmost component in each layer has the highest priority. This meaning the more leftwards the component is, the higher chances of it being selected. For example, in FIG. 4, in Transport Layer 406, components listed from left to right are TCP 408, UDP 410 and SPX 412. That means TCP 408 has a higher priority than UDP 410 and UDP 410 has a higher priority than SPX 412.

Every component in VStack 400 is actually a REntry (210 in FIG. 2), not the real instance of the protocol component Class. But the REntry (210 in FIG. 2) stores the name and location of the functional Class, the behavior, requirements and properties of the component.

The solid line 402 in FIG. 4 are valid dependencies, while the dashed line 404 indicates a possible dependency-conflict. The VStack 400 is searched in a left-to-right order and a protocol graph with no dependency-conflict is a potential stack matching the application requirements. For example, in FIG. 4, potential protocol stacks got from the VStack 400 are:

"MPA_Encoder 414/TCP 408/IP 416",
"MPA_Encoder 414/UDP 410/IP 416",
"MPA_Encoder 414/SPX 412/IPX 420",
"G723_Encoder 418/TCP 408/IP 416",
"G723_Encoder 418/UDP 410/IP 416", and
"G723_Encoder 418/SPX 412/IPX 420" (in the order of left-to-right searching).

The VStack 400 is then extended into a series of Eligible Stack (EStack) (316 in FIG. 3) with no dependency-conflict. One of the EStacks (316 in FIG. 3) will be selected for the construction of the real stack. This selection is based on the priority order where two strategies apply in the example embodiment:

Fast extend: VStack 400 is searched top-down via leftmost components in each layer until the first compatible protocol graph is found. This protocol graph should have the highest priority under protocol compatibility constraints.

Full extend: all possible protocol graphs will be explored. This method is preferred in case that synchronization between sender and receiver is enabled. The final decision may depend on the compatibility of the EStack (316 in FIG. 3) at the other end.

For example, "MPA_Encoder 414/TCP 408/IP 416" has a higher priority to be selected than "MPA_Encoder 414/UDP 410/IP 416". If the Protocol Stack synchronization feature (to be covered later) is enabled, the selection of the EStack (316 in FIG. 3) also depends on the potential protocol stacks on communication peers to ensure the EStack (316 in FIG. 3) selected on both sides are compatible with each other.

The EStack (316 in FIG. 3) is a not-yet-functional protocol graph where each component is still a REntry (210 in FIG. 2) instead of a real implementation of the protocol.

In the Protocol building and configuration, Stack Configurator (302 in FIG. 3) calls Build Layers (320 in FIG. 3), to create the real functional stack—Fstack (318 in FIG. 3).

As mentioned before, REntry (210 in FIG. 2) stores the name and location of the Class file of the protocol component. In Build Layers (320 in FIG. 3), each protocol component Class will be instantiated. Stack Configurator (302 in FIG. 3) will then call Config Layers (322 in FIG. 3) to configure the parameters of each component according to the specification in StackSpec (312 in FIG. 3).

After the components in all layers are created and configured, component in one layer is then bound to components in adjacent layers directly, or through a Connector (120 in FIG. 1). The using of connector (120 in FIG. 1) allows the flexible composition of components of different types and interfaces. Essentially, it is abstraction of component interrelationships.

Connector (120 in FIG. 1) abstracts the connectivity between protocol layers. It is defined as an abstract interface in the example embodiment allowing component developers to customize their behavior. In the current implementation of the example embodiment, two types of connectors have been provided—BasicConnector and Reflect!veConnector, to support full functionalities of dynamic protocol stacks.

A BasicConnector is a simple functional connector that does nothing much more than to connect two adjacent layers, allowing the layers to inter-communicate.

A Reflect!veConnector is a more sophisticated specialized connector which supports removing, inserting and swapping of protocol components. The functionalities of ReflectiveConnector will be described in more detail when the reconfiguration of the protocol stack is discussed later.

After connecting the protocol components, FStack (318 in FIG. 3) is created. The FStack (318 in FIG. 3) is the genuine stack containing functional instances of protocol components where parameters of each component will be configured according to StackSpec (312 in FIG. 3).

Figure 5:
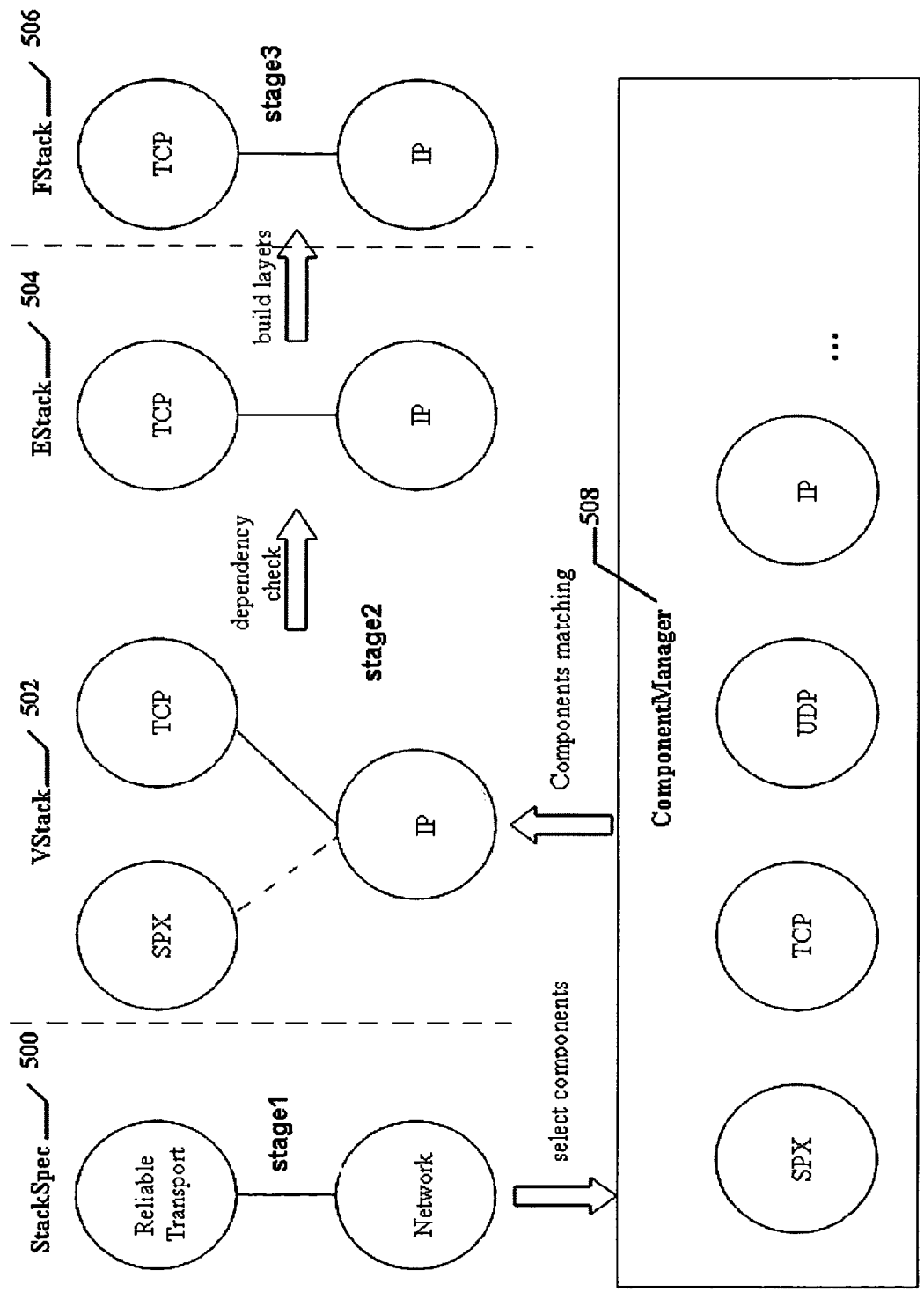
FIG. 5 shows an example of the 3-stage protocol configuration of the Dynamic Protocol Framework described in the example embodiment.

FIG. 5 illustrates a simple example of the 3-stage protocol configuration mentioned above.

In the first stage, the StackSpec 500 defines two layers in the required stack. One is a transport layer, which requires reliable service; the other is a network layer.

In the second stage, by selecting components in the Component Registry, the VStack 502 is created. In the transport layer, two components are selected; TCP and SPX, both of them provide reliable transport service. One component, IP, is selected for the network layer. For SPX working over IP causes a dependency-conflict, only the TCP/IP is selected as the EStack 504.

In the third stage, the functional instances of protocol components are produced to form the FStack 506.

As said before, Stack Configurator (302 in FIG. 3) also supports on-the-fly reconfiguration of protocol stack during a streaming session. The reconfiguration of protocol stack includes reconfiguring, adding, removing and swapping of components.

Runtime reconfiguration of the protocol graph while maintaining "smoothness" is made possible in DPF based on the following principles:

1. Consistency and Integrity: Reconfiguration of a component must not break the existing service dependencies, and should satisfy any new dependencies resulted from the change.

2. Runtime compatibility: While one may pass the integrity and consistency test, reconfiguration must not continue if it would break other components.

3. Safe-State: Reconfiguration may only continue when the components affected are in a "safe-state" to minimize data loss. Generally, a component is in "safe-state" when it has no input buffer to process at an instance.

4. Transactions: Reconfiguration operations are not committed until all actions are performed completely and point 1, 2 and 3 are satisfied. Any one of the stated requirements not fulfilled will cause the transaction to be rolled back or aborted.

Reconfiguration operations in the example embodiment are generally defined as the adaptation, adding, removal and replacement of components. Adaptation of a protocol component, such as resetting the encryption key of the encryption component, is within the component itself and can be achieved by reflection, which generally will not affect the dependencies and compatibility with other components in the protocol graph, so there is not much difference from configuring the components during stream setup. In contrast, adding, removing and swapping components in the protocol stack may trigger the reconfiguration of the protocol graph. In order to support these operations seamlessly, a specialized connector is utilised in the example embodiment.

A Reflective Connector is an example of one such specialized Connector for connecting components in adjacent protocol layers. The Reflective Connector is re-configurable in three ways, namely cloning, merging and swapping.

Addition and removal of protocol components are done by cloning and merging Reflective Connectors.

With reference to FIG. 6A, to add a new component 602 into the protocol stack, this new component 602 is "fed" into the Reflective Connector 600 that connects the two layers between where the new component 602 is expected to be inserted. The Reflective Connector 600 then splits itself into two, binding the inner ends of the connectors 604 to the new component 602, and maintaining the existing connections on the outer ends 606.

Merging is done in a similar manner, but involves merging two ReflectiveConnector objects 608 and 610 respectively into one 612 as is shown in FIG. 6B.

Figure 7:
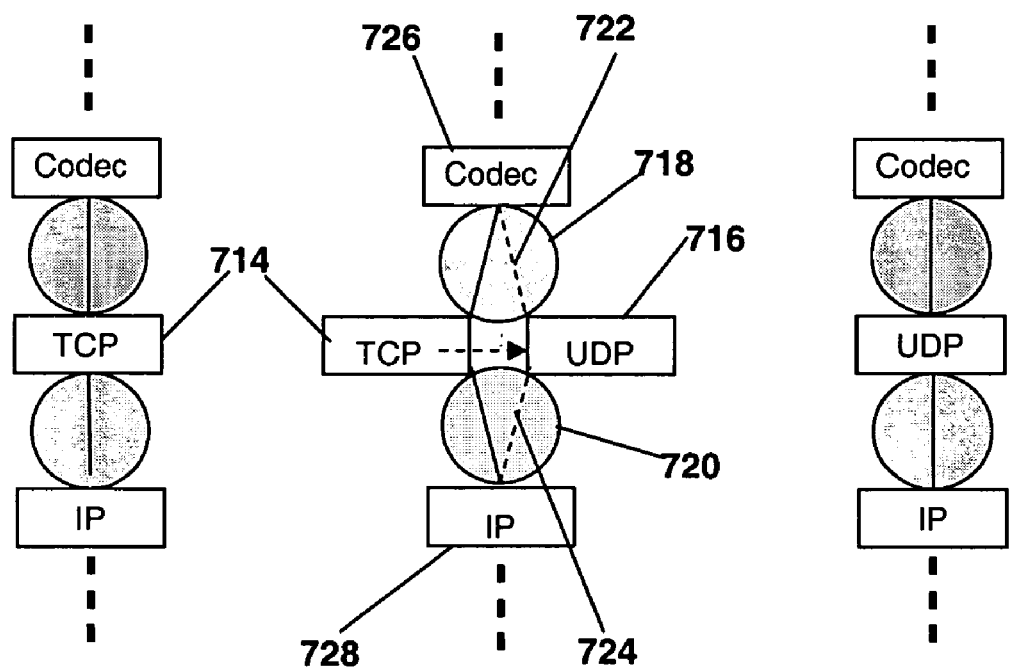
FIG. 7 shows the swapping operation of a Reflective Connector component of the Dynamic Protocol Framework described in the example embodiment respectively.

With reference to FIG. 7, the Reflective Connector may also function as a "switch point". In the case of swapping, where a new protocol component 716 replaces an old protocol component 714 on the same layer, an operation has to be performed by the upper and lower connectors, 718 and 720 respectively. Temporary pointers, 722 and 724 for the upper and lower connectors respectively, are used to connect the new protocol component 716 to existing components 726 and 728 until the protocol stack is ready to perform an actual swap. Once ready, the temporary pointers 722 and 724 will convert to become the only pointers binding existing components 726 and 728 to the new protocol component 716. Resources used by the old protocol component 714 will be closed/terminated/recycled and the object instance of the old protocol component 714 will be discarded. By this time, the temporary connection becomes a permanent connection and the new component 716 starts to operate in the protocol stack.

As mentioned, the example embodiment may provide the flexibility of building a protocol graph of dynamically loaded protocol service components. One result achieved by utilising the example embodiment for a linear protocol stack computer network can be shown in FIG. 8.

Figure 8:
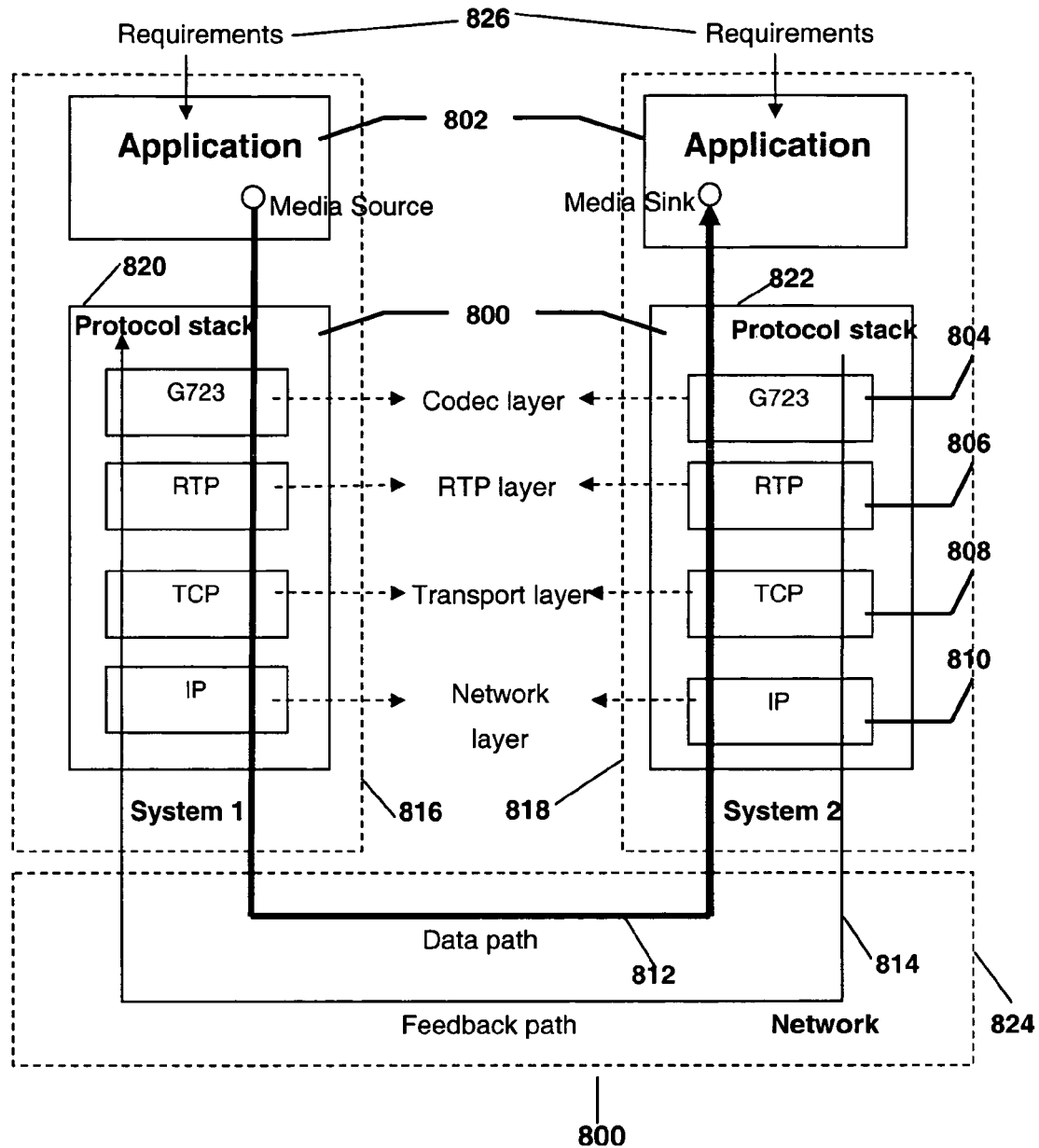
FIG. 8 shows an example of a protocol stack built by the Dynamic Protocol Framework described in the example embodiment.

FIG. 8 illustrates an example of a protocol stack 800 built by the example embodiment supporting distributed multimedia applications 802 with certain requirements 826. From FIG. 8, we can see data being routed, as shown by data path 812 and feedback path 814, between data sources and network devices, indicated as System 1, 816, Network 824 and System 2, 818, through a graph of protocol components, which is represented by protocol stacks 820 and 822. All protocol components are organized in a layered structure. The protocol components are as follow:

a) the Codec layer 804, which is utilising G723 standards;
    b) the Real Time Protocol (RTP) layer 806, which is utilising RTP standards;
    c) the Transport layer 808, which is utilising Transport Control Protocol (TCP) standards; and
    d) the Network layer 810, which is utilising Internet Protocol (IP) standards.

Another important component in the example embodiment is the Synchronization Manager (SyncManager 122 in FIG. 1). The SyncManager (122 in FIG. 1) ensures the operative integrity of protocol stacks across flow end-points, for example, communication between two nodes in computer network utilising a particular communication protocol stack. Alternatively, it can be seen as a session setup and configuration manager.

In the scenario of a unicast setup, there may be a transmission end-point and a reception end-point. The Synchronization Manager will ensure that the protocol configurations on both end-points are compatible and the protocol stacks are in an appropriate state. For example, if the transmission end-point is configured to use TCP, there cannot be a reception end-point that is configured to use UDP. Also, a TCP connection cannot be established if a TCP socket listener has not been setup on at least one end.

There are three steps to execute synchronization. Firstly, synchronizing the StackSpec (312 in FIG. 3). Secondly, synchronizing the Vstack (400 in FIG. 4). Thirdly, synchronizing remote parameters. Synchronization of StackSpec (312 in FIG. 3) includes synchronizing layers and synchronizing features in each protocol layer. One example of synchronizing StackSpec (312 in FIG. 3) is shown in FIG. 9.

Synchronizing layers ensures the consistency of layers on communication protocol stacks on two communicating end-points. This is necessary because some protocols requires presence in pairs, such as a successful TCP connection requires that TCP resides in both communication protocol stacks on the two communicating end-points.

Figure 9:
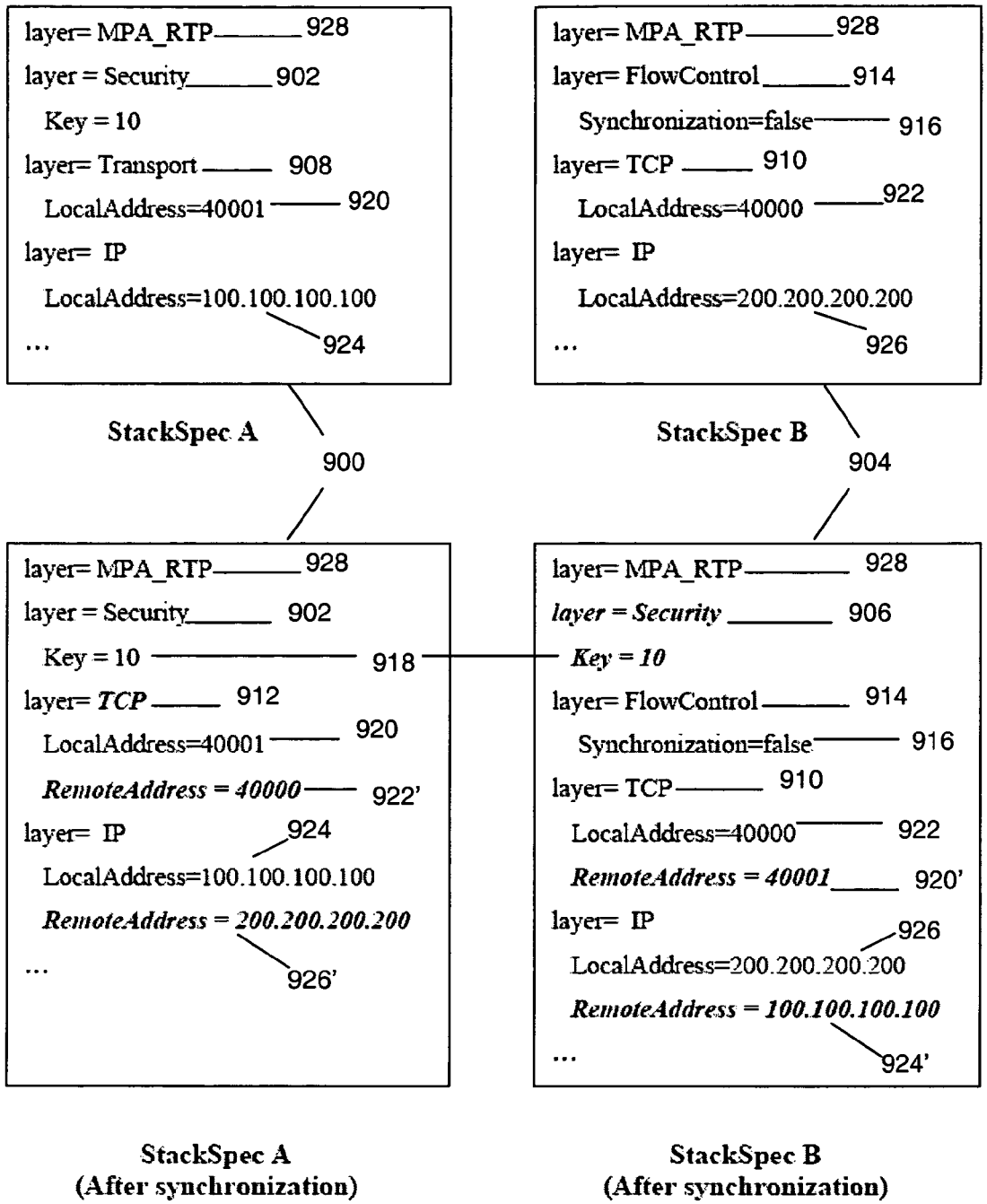
FIG. 9 shows an example of protocol stack specification (StackSpec) synchronization by the Dynamic Protocol Framework described in the example embodiment.

With reference to FIG. 9, StackSpec A 900 specifies a Security layer 902 in the protocol stack, which is not in StackSpec B 904. After synchronization, a Security layer will be added into StackSpec B 904 as shown in 906. In addition, StackSpec A 900 specifies the transport layer 908 in the protocol stack without allocating a specific protocol . On the other hand, StackSpec B 904 sets a specific transport protocol, TCP 910. After synchronization, the transport layer 908 of StackSpec A 900 will be set to TCP 912 to be consistent with StackSpec B 904. So far the discussion is based on synchronization of protocol components and layers that can only exist as identical pairs for operation between two communication nodes. In cases where certain services need not appear in pairs, for example, a flow control service 914 existing in only one communication end-point, the example embodiment can avoid unnecessary synchronization by specifying the layer as "Synchronization=false" 916 which indicates no synchronization is required for this layer.

Synchronization of features in layers ensures the consistent configuration in the same layer. For example, the symmetric keys "Key=10" 918 of the security layers 902 and 906 for both communication sites 900 and 904 should be the same. Another feature that requires synchronization in the computer network example is the remote address of a first communication end-point that a second communication end-point is communicating to. In both StackSpecs A 900 and B 904, the local transport address 920 and 922 respectively and network addresses 924 and 926 respectively are specified as shown in FIG. 9. After synchronization, the local transport and network addresses 920, 922, 924 and 926 will appear as the remote addresses 920', 922', 924' and 926' respectively on the peer's StackSpec. For completeness sake, the Real Time Protocol layer "MPA_RTP" 928 of StackSpec A 900 and B 904 are the same, therefore no synchronization is required.

Figure 10:
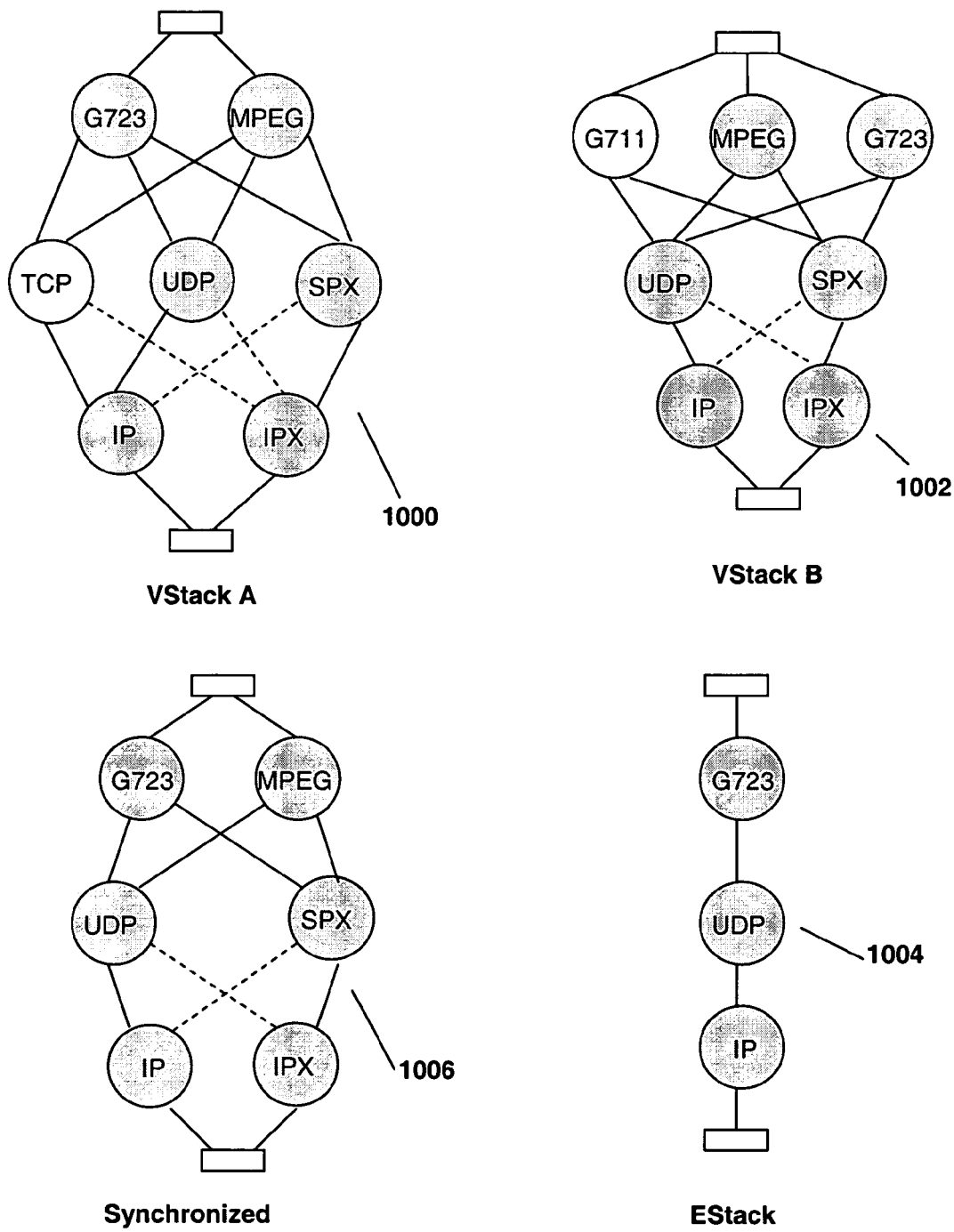
FIG. 10 shows an example of sender-based Virtual Stack (VStack) synchronization of the Dynamic Protocol Framework described in the example embodiment.

As mentioned before, automatically selection of components is not only based on the StackSpec (312 in FIG. 3), but also based on the available components stored in Component Registry (204 in FIG. 2). Therefore to achieve the desired selection result, VStack (400 in FIG. 4) needs to be synchronized too. FIG. 10 illustrates an example of synchronizing the VStack (400 in FIG. 4). This synchronization simply picks all the common components in VStack A 1000 and VStack B 1002. Thus, the components in the final EStack 1004, which comes from the synchronized VStack 1006, will be available on both communicating sites.

The third synchronization is for remote parameters. Some remote parameters can be synchronized/exchanged during the synchronization of the StackSpec (312 in FIG. 3). But some remote parameters may not be specified in the StackSpec (312 in FIG. 3); they are generated when the service component are instantiated. For example, the local transport address may not be generated until the TCP component is instantiated, when a free port will be selected. In most cases, only the sender of the communication peers need to know the remote parameters of the receiver to establish the connection. So this synchronization is mostly sending parameters of the receiver's stack to the sender. Moreover, not all parameters need to be synchronized. Only parameters extend a Remote Parameter interface will be sent to the other peer. In another words, if a parameter needs to be known by the communicating peer, such as the local transport address of the receiver, just simply extend the RemoteParameter interface.

In the example embodiment, the synchronization processes are managed by the SyncManager (122 in FIG. 1). There are two types of SyncManagers namely, SyncSlave and SyncMaster. SyncSlave resides on the local site of the communication end-point. SyncMaster can reside on the local site of one communication end-point or reside on a third-party site. SyncMaster will perform the synchronization and SyncSlave works as an agent to SyncMaster. SyncSlaves and SyncMaster together form a distributed synchronization channel as showed in FIG. 11.

In FIG. 11A, one SyncMaster 1100 is on the sender's site 1102, while one SyncSlave 1104 is on the receiver's site 1106. The SyncMaster 1100 and SyncSlave 1104 communicate with each other to perform the synchronization of the protocol stack building on the two stream end-points.

In FIG. 11B, there is one SyncSlave 1108 and 1110 on each communication peer. One SyncMaster 1112 resides on a third-party site. Both SyncSlaves 1108 and 1110 communicate with the SyncMaster 1112 to perform the synchronization. Allowing the SyncMaster 1112 to operate on a third-party site provides flexibility as the resource intensive synchronization processing is removed from the communication end-points 1114 and 1116. This is very useful especially when the communication end-points are mobile devices with lower processing capability.

Figure 12:
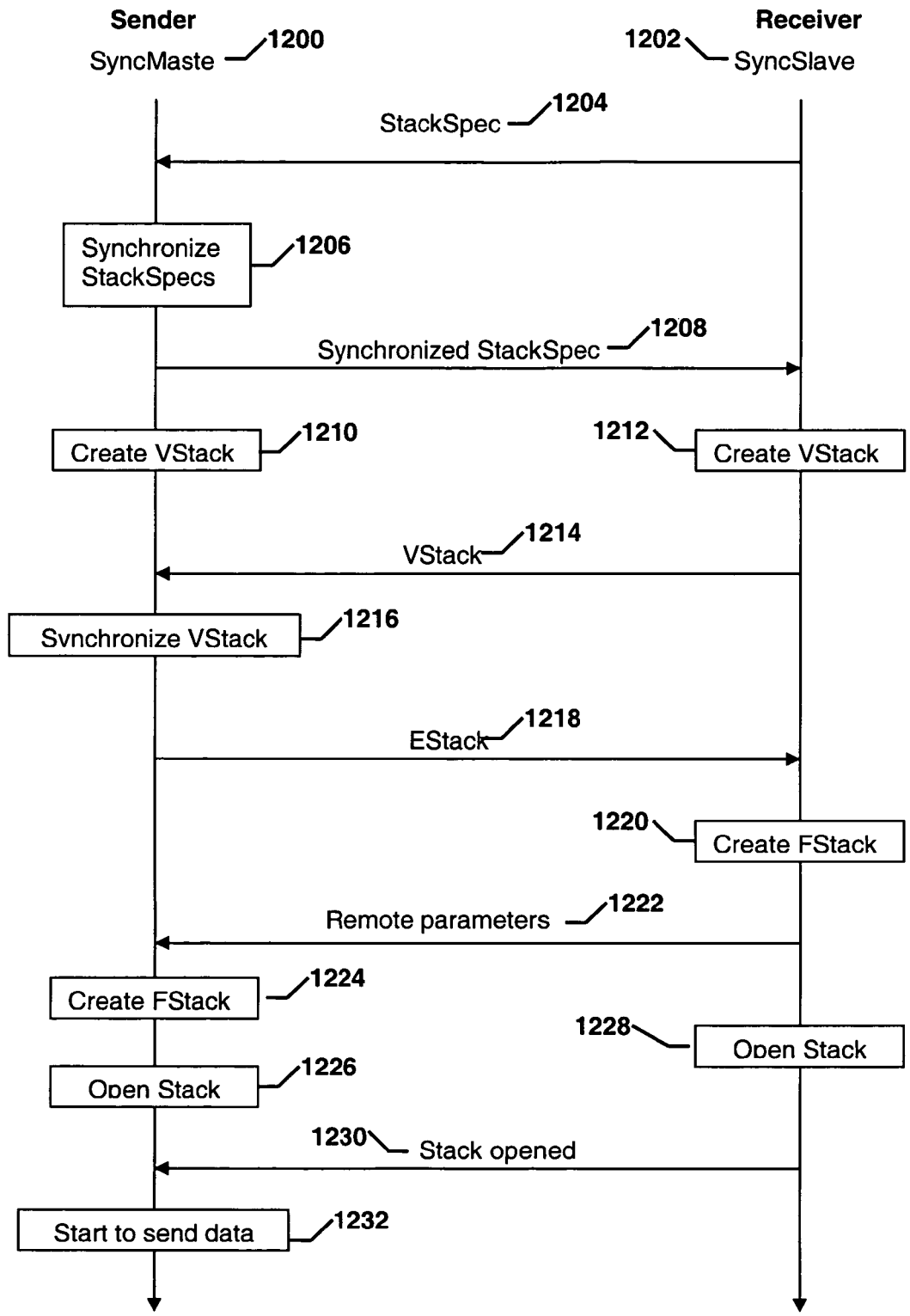
FIG. 12 shows the workflow of the synchronization procedure of the Dynamic Protocol Framework described in the example embodiment that is used to illustrate FIG. 11A.

FIG. 12 illustrates the synchronization procedure for the case showed in FIG. 11A. Sender and SyncMaster are denoted interchangeably as 1200. Receiver and SyncSlave are denoted interchangeably as 1202. There is one SyncMaster 1200 on the sender's site, one SyncSlave 1202 on the receiver's site. The SyncSlave 1202 first sends the receiver's StackSpec 1204 to the SyncMaster 1200 on the sender's site to synchronize with the sender's StackSpec 1206. The synchronized StackSpec 1208 is then send to the SyncSlave 1202. SyncSlave 1202 next calls Stack Configurator (302 in FIG. 3) to create VStack 1212 according to the synchronized StackSpec 1208 and send the simplified VStack 1214 to SyncMaster 1200. The SyncMaster 1200 then synchronizes the VStack 1216 received from the SyncSlave 1202 with the VStack created locally 1210. After synchronization and dependency check, the EStack 1218 is created and sent to the SyncSlave 1202. Based on the EStack 1218, FStack 1220 is created on the receiver's site 1202. During creation of the Fstack 1220, the run-time (remote) parameters 1222 are generated and sent to the sender's site. These parameters 1222 are then used to create the FStack 1224 of the sender 1200. Finally, the SyncSlave 1202 calls open stack 1228 and similarly the SyncMaster 1200 also calls open stack 1226, thereafter a "stack opened" event 1230 is sent to the sender 1200, which is then enabled to start sending data 1232.

Figure 13:
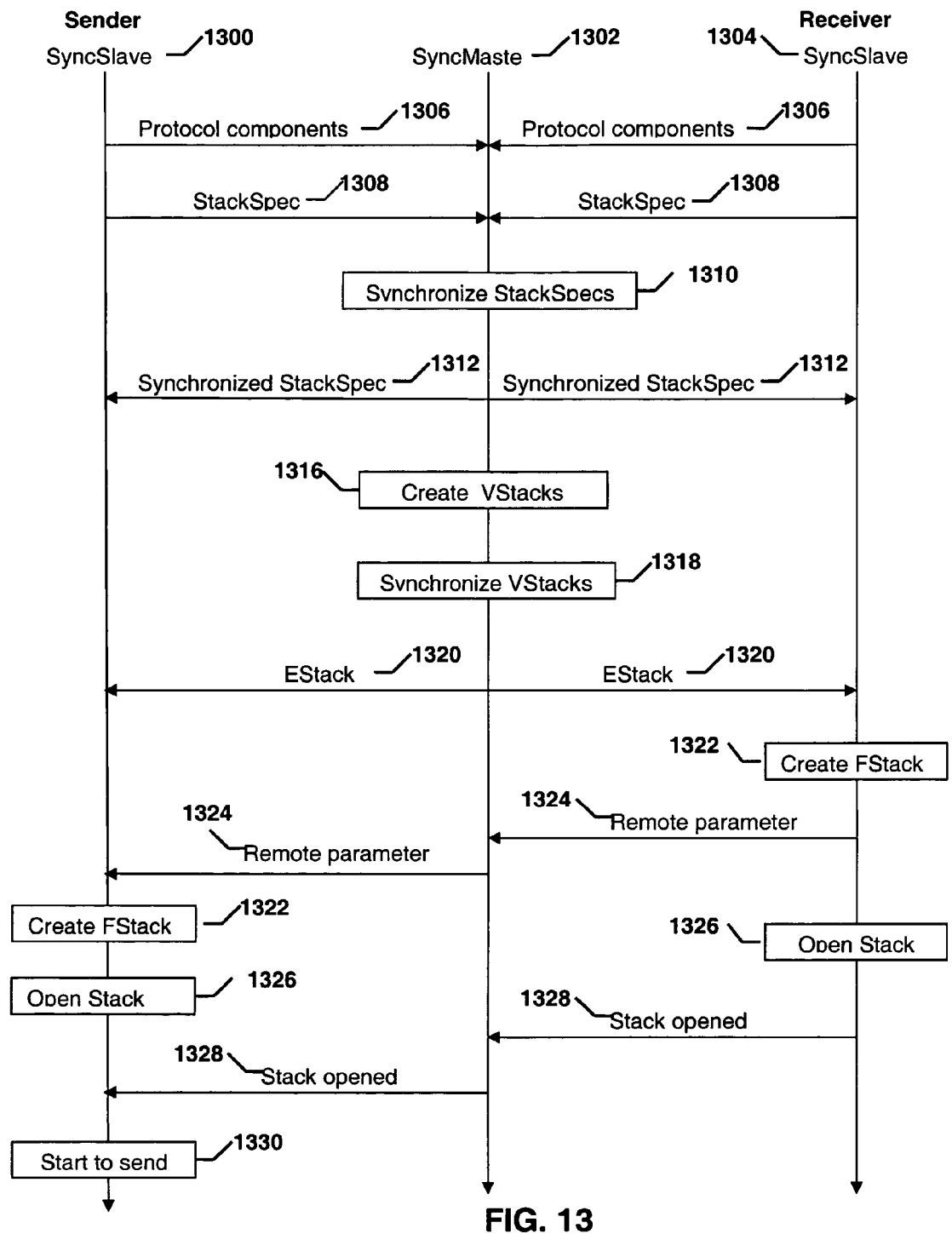
FIG. 13 shows the workflow of the synchronization procedure of the Dynamic Protocol Framework described in the example embodiment that is used to illustrate FIG. 11B.

FIG. 13 is the synchronization procedure for the case showed in FIG. 11B where the SyncMaster 1302 resides on a third-party site. Sender and SyncSlave at sender end are denoted interchangeably as 1300. Receiver and SyncSlave at receiver end are denoted interchangeably as 1304. Two SyncSlaves 1300 and 1304 are on the sender and receiver's sites respectively. These SyncSlaves 1300 and 1304 communicate through the SyncMaster 1302 to perform the synchronization. Firstly, SyncSlaves 1300 and 1304 send all local register of protocol components 1306 and StackSpec 1308 to the SyncMaster 1302. Next, the SyncMaster 1302 synchronizes the StackSpec 1310 and sends the synchronized StackSpec 1312 back to the SyncSlaves 1300 and 1304, respectively. The SyncMaster 1302 then creates sender's VStack 1316 and receiver's VStack 1316 on the third-party site. The synchronized VStack 1318 beginning thereafter and the subsequent creation of EStack 1320 are performed at the third-party site. The established EStack 1320 is then sent to both SyncSlaves 1300 and 1304 for the creation of the FStack 1322. The receiver 1304 creates FStack 1322 first followed by forwarding the required remote parameters 1324 to the sender 1300. The sender 1300 then creates the FStack 1322 and configures it with the remote parameters 1324 sent by the receiver 1304. Finally, both sender and receiver open the stack 1326. After receiving the "stack opened" event 1328 from the receiver 1304, the sender 1300 is enabled to start sending data 1330.

Besides unicast, the example embodiment also supports the case of multicast. In a multicast connection there is one SyncMaster and multiple SyncSlave. Similar to unicast, SyncMaster can reside on a third-party site or reside on one of the communicating end-point, usually on the sender's site. The SyncMaster and all SyncSlaves work together to form the synchronization channel. During the setup of the multicast stream, all StackSpecs, VStacks and remote parameters of the multicast participants are synchronized. The synchronization results comprising of synchronized sender's StackSpec, synchronized receiver's StackSpec, synchronized EStack (it is the same for sender and receiver) and the remote parameters are stored in SyncMaster. At a later time, when a new sender or receiver joins the multicast, all these synchronization results will be directly sent to the new participant to create the protocol stack.

Figure 14:
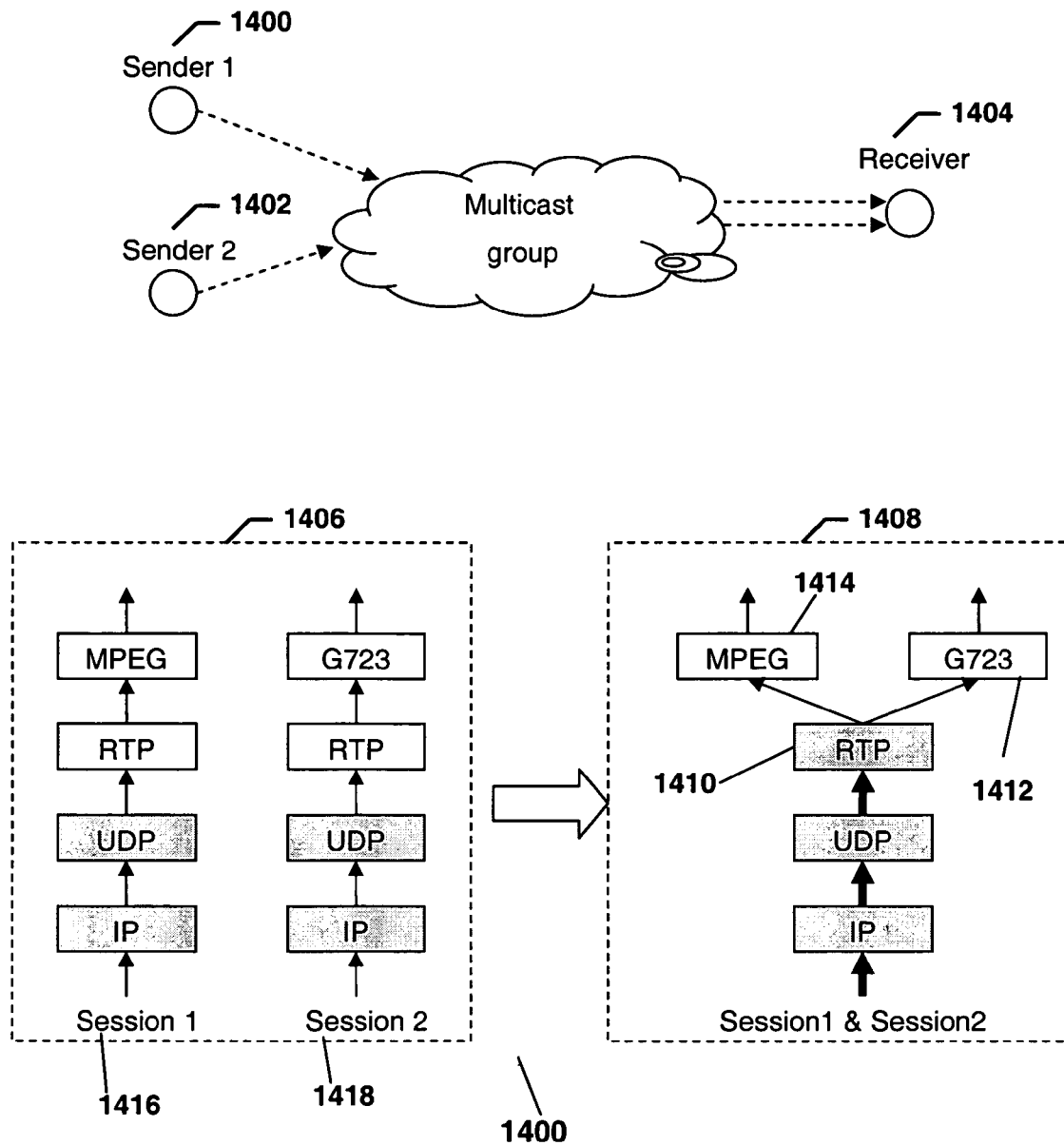
FIG. 14 shows the use of non-linear protocol stack for supporting multicast by the Dynamic Protocol Framework described in the example embodiment.
Figure 15:
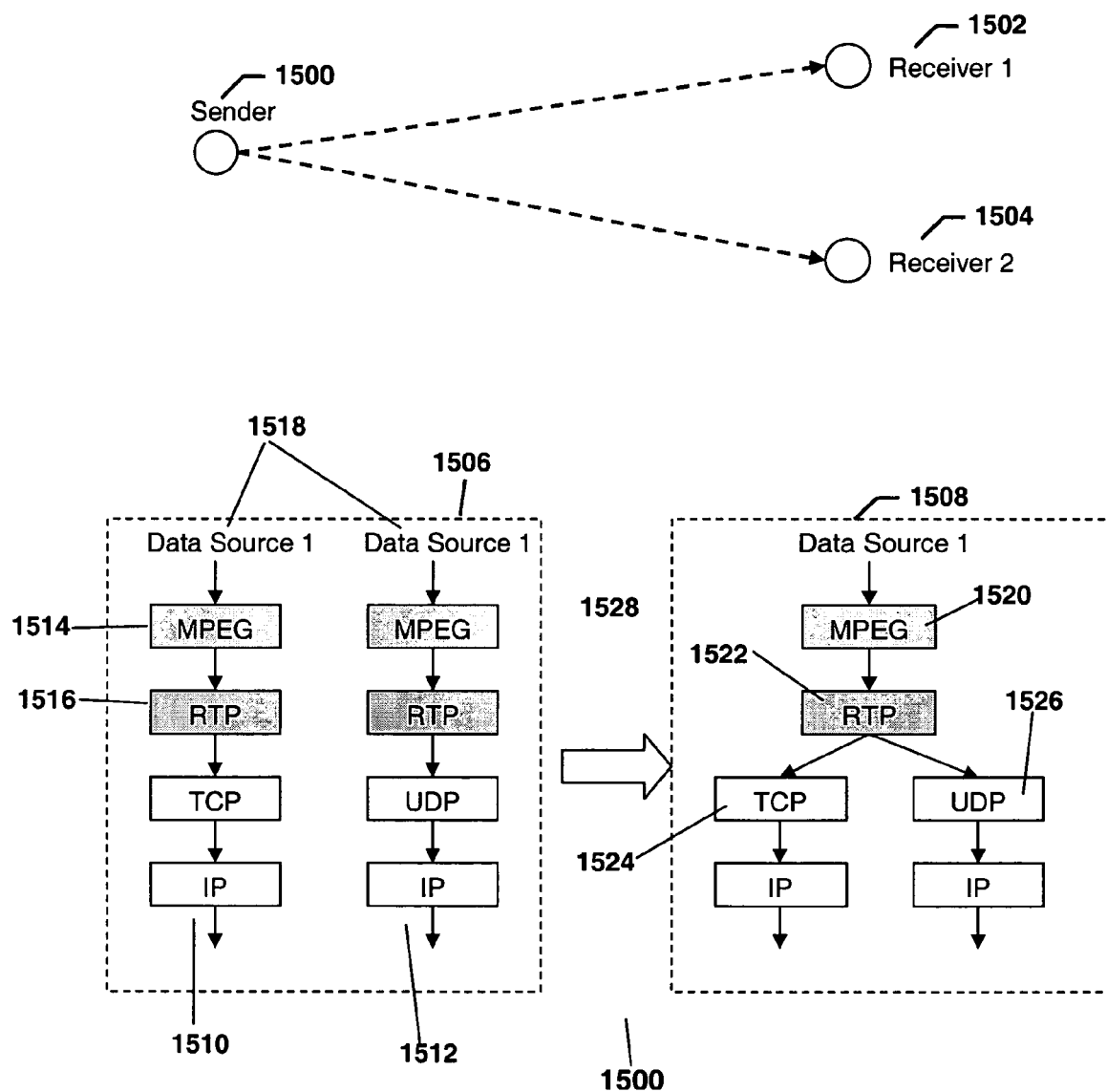
FIG. 15 shows the use of non-linear protocol stack for point-to-multiple point transmissions by the Dynamic Protocol Framework described in the example embodiment.

In the past, traditional protocol stack is a linear graph usually comprising just one protocol component in one layer. Researches on parallel protocol stack have being carried out but most of the: parallel stacks in the researches are for load balancing purposes. The same protocol in one layer can have multiple implementation entities which process in parallel to improve the efficiency. While there is still actually one flow in the parallel stack, the DPF described by the example embodiments of the present invention provides the flexibility to create a non-linear/parallel protocol graph, which corresponds to multiple flows. In the non-linear protocol graph created by the DPF, there may be multiple protocol components in one layer and these protocol components can be the implementation of one protocol or multiple different protocols as well. This non-linear protocol stack can also be regarded as multiple linear protocol stacks combined together to share protocol components. One objective of creating this non-linear protocol stack is for optimizing duplicated processing. Another objective is to support some cases in multicast where combining multiple linear protocol stack and sharing protocol components are necessary. FIG. 14 and FIG. 15 show example of cases that require nonlinear protocol graph.

In the example embodiment, with reference to FIG. 14, two senders, Sender 1 1400 and Sender 2 1402 sends data to the same multicast group and 1404 joins this multicast group as a receiver. In the present example, the same multicast group means the same multicast IP address plus the same transport address. 1406 indicates the two linear protocol stacks 1416 and 1418 created by the receiver 1404 to receive data sent by Sender 1 1400 and Sender 2 1402. In the present example, as a known fact, one system is not allowed to open two UDP ports with the same port number and the same IP address. Therefore, to receive two sessions through one UDP port and one multicast IP address, the receiver 1404 needs to create a non-linear protocol stack 1408. This non-linear stack is actually the combination of the two linear stack by sharing one UDP and IP component. Both of these two sessions will then be sent to the RTP component 1410 which is capable of de-multiplexing the two sessions by checking the session Identification (ID) and forwarding them to the corresponding components 1414 and 1412 in the Codec layer.

In another example embodiment, with reference to FIG. 15, there is another kind of usage for non-linear stack. One sender 1500 sends the same data e.g. a song to both Receiver 1 1502 and Receiver 2 1504. 1506 shows the two linear stacks 1510 and 1512 created to send these two sessions. Supposing both linear stacks 1510 and 1512 have a MPEG layer 1514 to encode the data and a RTP layer 1516 to manage the audio steaming, since the input data source 1518 are the same, the upper part of these two stacks can be combined together as showed in 1508. In other words, components MPEG 1520 and RTP 1522 can be shared by two stacks to reduce duplicate processing. In the non-linear stack 1508, the output of RTP 1522 are made into two copies and sent respectively to the two components 1524 and 1526 at the transport layer.

Figure 16:
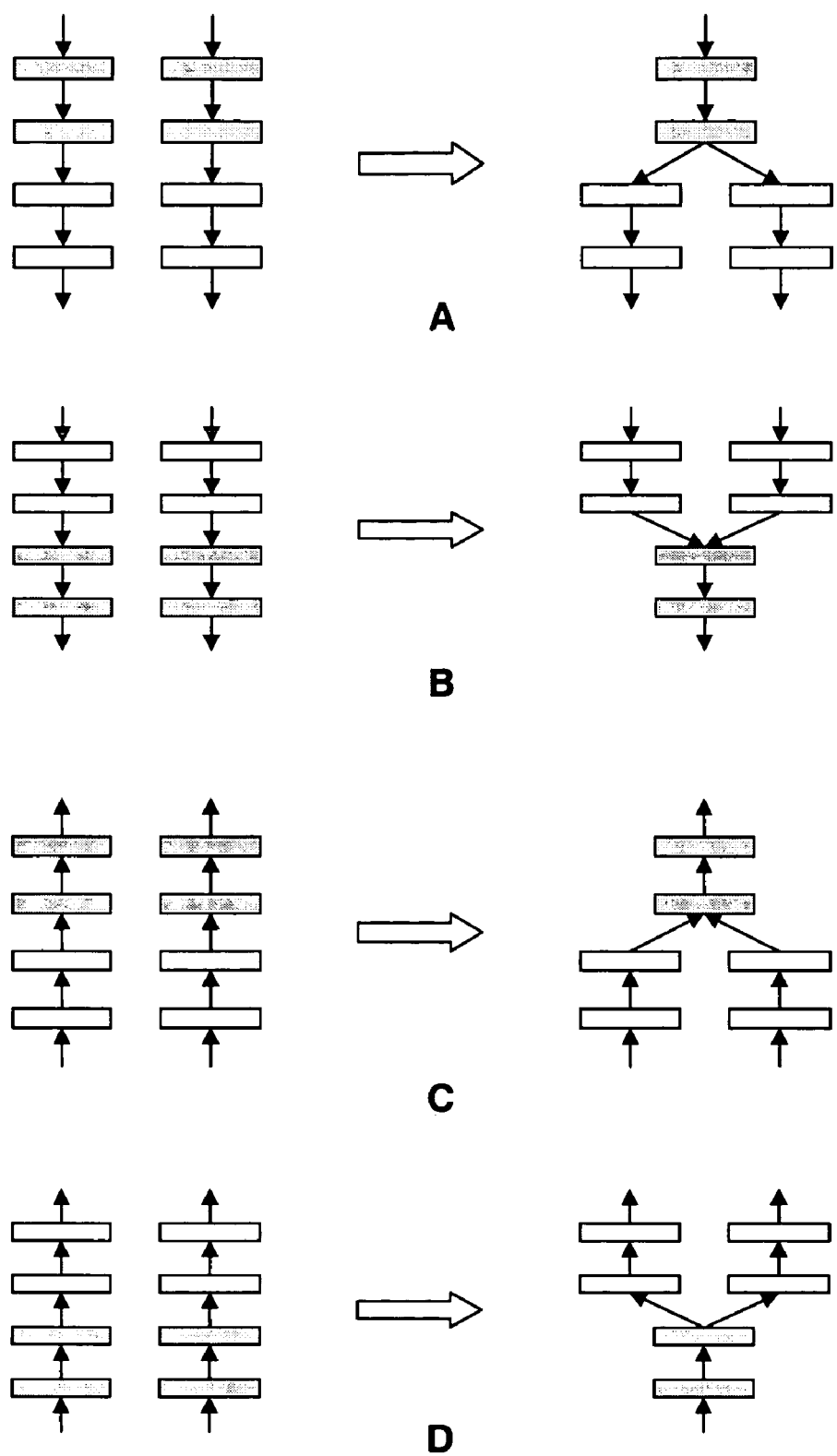
FIG. 16 shows examples of configuration scenarios relating to non-linear protocol stack of the Dynamic Protocol Framework described in the example embodiment.

FIG. 16 shows four possible examples of non-linear protocol stack. The shaded boxes represents common components in the protocol stack. Common components are components that are instances of the same Class object and have same configuration, for example, the UDP components and IP components in 1406 of FIG. 14. The UDP components in two linear stacks are regarded as common components only when they are configured with the same port number. In 1506 of FIG. 15, the IP components in two stacks are not common components because these two sessions are sent to two destinations, thus the configuration of IP addresses are different.

Whether multiple linear stacks can be combined into a parallel stack depends on whether they have common components. If they have common components, the options become whether the common component adjacent to the different components has the ability of multiplexing (as showed in FIG. 16B, FIG. 16C) or demultiplexing (as showed in FIG. 16A, FIG. 16D).

Figure 17:
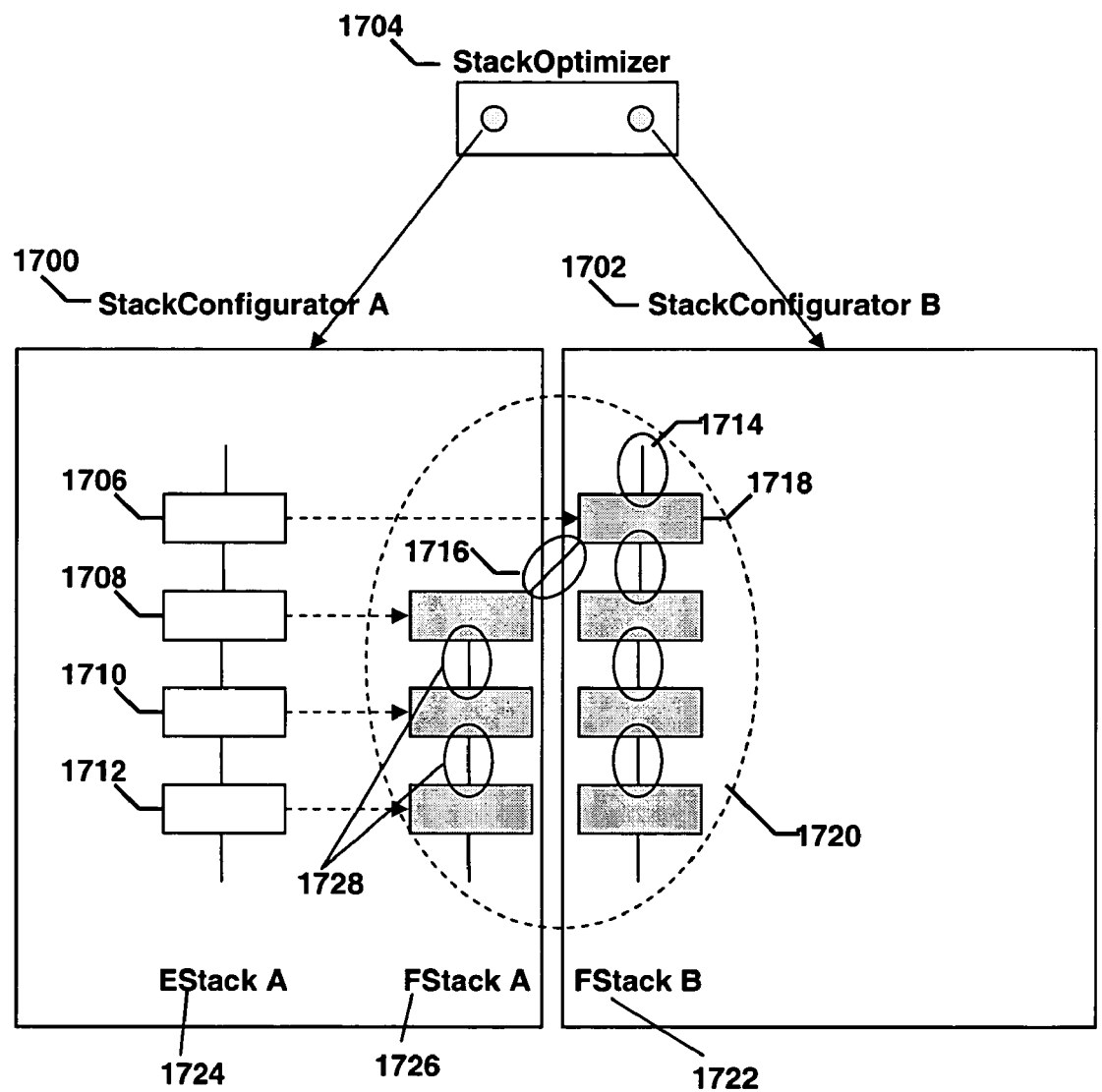
FIG. 17 shows the procedure used for creation of a non-linear protocol stack by the Dynamic Protocol Framework described in the example embodiment.

In the example embodiment, component Stack Optimizer (126 in FIG. 1) and Stack Configurator (102 in FIG. 1) work together to create the non-linear stack. FIG. 17 illustrates the procedure of creating a non-linear stack. Stack Optimizer 1704 keeps track of all linear stacks created by Stack Configurators. Before building the FStack, Stack Configurator A 1700 checks with Stack Optimizer 1704 whether the EStack can be combined with other existing stacks. Suppose Stack Configurator B 1702 has created a linear protocol stack B (associated to FStack B 1722), which can be combined with stack A (associated to EStack A 1724). The common components are 1706 and 1718. When building FStack A 1726, Stack Configurator A 1700 instances components 1708, 1710, 1712 and connects them with connectors 1728. For component 1706, Stack Configurator A 1700 does not instantiate it but creates a connector 1716 to connect the real implementation of component 1708 with 1718 which is the existing instance of 1716 in FStack B 1722. Thus a non-linear stack 1720 is created.

In non-linear stacks, the reconfiguration of components in parallel branches is no different from the reconfiguration of components in linear stacks. For example, in nonlinear stack 1508 of FIG. 15, UDP, TCP and two IP components can be reconfigured in the same way as in a linear stack. But if reconfiguring the components in the common trunk involves swapping the component 1528 to another codec, the non-linear stack 1508 of FIG. 15 should be split back to linear stacks as the so called common components become different components after reconfiguration and therefore can not be shared any more.

The example embodiment may be implemented choosing Java as the programming language for platform independence. The reflection API of Java that represents and reflects classes, interfaces, and objects in Java Virtual Machine is beneficial in the implementation. Dynamic class loading features of Java provides the means to load and configure/reconfigure protocol components at runtime.

In an example implementation, J2SE (Java 2 Standard Edition) is chosen as the primary development platform on personal computers. The Dynamic Protocol Framework (DPF) _described by the example embodiment is ported to Microsoft Pocket PC using J2ME (Java 2 Platform, Micro Edition). JMF (Java Media Framework) is used as the runtime environment for multimedia streaming. The control channel between SyncManager (122 in FIG. 1) and SynClient is implemented using RMI (Remote Method Invocation), which enables Java-based applications with distributed communication functionality.

An example configuration of the test bed may be as follows: five DELL personal computers with Pentium IV processor 1.6~2.4 GHz and 256~512 MB memory, are employed as end-nodes. Microsoft Windows XP is the primary operating system on these machines. Every end-host has ten protocol components: RTP, TCP, UDP, IP (unicast/multicast), G711 codec, G723 codec, GSM codec, MPEG codec, affined encryption/decryption and stop-and-wait flow control.

Two tests to evaluate the performance of the example embodiment can be conducted as follow. Firstly, utilising two computers to act as a sender/receiver pair to test the protocol stack configuration in unicast settings. Secondly, the DPF functions of the example embodiment in multicast settings are carried out where one PC acts as the sender and the other four PCs act as receivers. Sender-based synchronization is employed as the stack selection algorithm in both settings.

From the table 1800 in FIG. 18, that the test results show that it takes around 500 ms to create a RTP connection using JMF. In this test scenario, the DPF of the example embodiment creates a "MPEG/RTP/UDP/IP" protocol stack to transmit media. Compared with directly using JMF to create a RTP connection, the DPF described in the example embodiment provides advanced functionality, such as stack synchronization, dynamic components selection and component configuration/reconfiguration, at an extra cost of less than one second. This conclusion applies to both unicast and multicast settings. The swapping of protocol components, on the other side, takes around 200 ms, which demonstrates the efficiency of the DPF described in the example embodiment.

FIG. 19 shows a chart 1900 containing the percentage of time spent in different phases of building a DPF stack utilising the example embodiment. In FIG. 19, "open stack" 1902 and "define stack" 1904 together take up 86% of the total time. "Open stack" 1902 is to initialize each protocol component in the protocol graph. Time for RTP initiation is greater than that of creating a normal UDP connection (which takes up around 20 ms in the test) because RTP provides additional end-to-end network delivery services for the transmission of real-time data. Thus the time spent in "open stack" 1902 is mainly for RTP initiation, which is the equal to RTP connection initialization time in FIG. 18.

"Define stack" 1904 is to retrieve appropriate components from Component Registry (200 in FIG. 2), which in the test, takes up around 500 milliseconds. The efficiency of search algorithm depends on the structure of Component Registry (200 in FIG. 2). Currently, the Component Registry (200 in FIG. 2) is organized in a vector that contains all components. Further refinement in storage pattern may be done to speed-up the retrieval.

Example embodiments of the present invention may provide the following advantages:

The DPF as described in the example embodiment provides multimedia adaptation at middleware level. Within the framework, applications do not need to pre-define the protocol stack at design time. Instead, the stack is dynamically built and configured at runtime according to application requirements and protocol components availability. In addition, DPF can adapt the protocol stack configuration during data transmission, which provides the flexibility to cope with heterogeneous runtime environments.

The DPF as described in the example embodiment provides a systematic and axiomatic way to configure and swap protocol stack where such adaptations can be triggered by various conditions such as network fluctuation, application requirement or device capability.

Further, example embodiments of the present invention can be customized to cater for requirement from different parties. Example embodiments address issues such as synchronization of object graphs on communicating peers, dynamically component selection and composition to build the communication path.

Moreover, the DPF described in the example embodiments provide a more flexible way whereby the user may specify either the name or the desirable propriety of a protocol component. An appropriate component that satisfies the requirement will be picked up automatically.

In addition, example embodiments support on-the-fly reconfiguration of the protocol stack with minimum transmission interruption and they provide the synchronization mechanism to ensure the compatibility of protocol stacks on communication peers.

Figure 20:
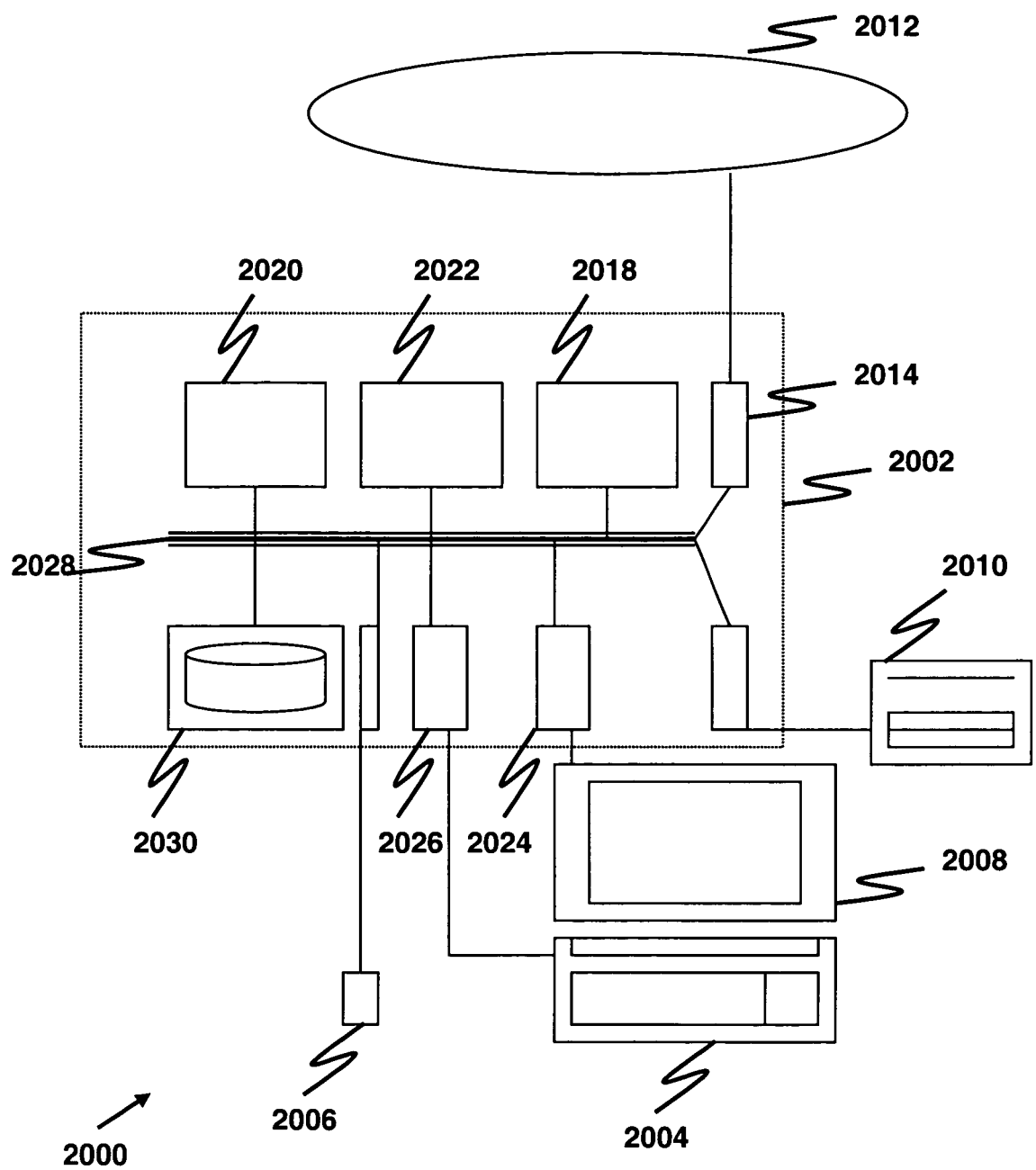
FIG. 20 is a schematic drawing of a computer system for implementing the system according to an example embodiment.

The method and system of the example embodiment can be implemented on a computer system 2000, schematically shown in FIG. 20. It may be implemented as software, such as a computer program being executed within the computer system 2000, and instructing the computer system 2000 to conduct the method of the example embodiment.

The computer system 2000 comprises a computer module 2002, input modules such as a keyboard 2004 and mouse 2006 and a plurality of output devices such as a display 2008, and printer 2010.

The computer module 2002 is connected to a computer network 2012 via a suitable transceiver device 2014, to enable access to e.g. the Internet or other network systems such as Local Area Network (LAN) or Wide Area Network (WAN).

The computer module 2002 in the example includes a processor 2018, a Random Access Memory (RAM) 2020 and a Read Only Memory (ROM) 2022. The computer module 2002 also includes a number of Input/Output (I/O) interfaces, for example I/O interface 2024 to the display 2008, and I/O interface 2026 to the keyboard 2004.

The components of the computer module 2002 typically communicate via an interconnected bus 2028 and in a manner known to the person skilled in the relevant art.

The application program is typically supplied to the user of the computer system 2000 encoded on a data storage medium such as a CD-ROM or floppy disk and read utilising a corresponding data storage medium drive of a data storage device 2030. The application program is read and controlled in its execution by the processor 2018. Intermediate storage of program data maybe accomplished using RAM 2020.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A dynamic protocol framework system comprising:
a registry containing object-oriented elements, each element corresponding to a resource protocol component available to the system;
a configurator unit for building two or more candidate protocol stacks from the object-oriented elements based on protocol specifications and for building and configuring a functional protocol stack from one of the candidate protocol stacks,
wherein protocol components in the functional protocol stack are interconnected via reconfigurable connector elements,
wherein each connector element is reconfigurable to enable cloning and merging of connector elements,
wherein two connector elements merge by maintaining respective existing connections to protocol components on respective outer ends of the two connector elements, by disconnecting respective connections on their respective inner ends of the two connector elements to a same inner protocol component, and merging into one connector element; and
a synchronization manager monitoring the building and re-configuration of protocol stacks for consistency with the protocol specifications and monitoring for compatibility and interoperability of protocol stacks of end-to-end communicating processes.

2. A dynamic protocol framework system comprising:
a registry containing object-oriented elements, each element corresponding to a resource protocol component available to the system;
a configurator unit for building two or more candidate protocol stacks from the object-oriented elements based on protocol specifications and for building and configuring a functional protocol stack from one of the candidate protocol stacks
wherein protocol components in the functional protocol stack are interconnected via reconfigurable connector elements,
wherein each connector element is reconfigurable to enable cloning and merging of connector elements,
wherein each connector element is arranged to enable swapping of a protocol component to which it is connected,
wherein each connector element establishes a connection to a new protocol component, while maintaining its active connection to an old protocol component, and disconnecting the connection to the old protocol components at an appropriate instance with respect to activation of the connection to the new protocol component; and
a synchronization manager monitoring the building and re-configuration of protocol stacks for consistency with the protocol specifications and monitoring for compatibility and interoperability of protocol stacks of end-to-end communicating processes.

3. The system as claimed in claims 1 or 2, comprising a parser unit for interpreting the protocol specifications and creating protocol stack specifications based on the protocol specifications, and the object-oriented elements for the building of the candidate protocol stacks by the configurator unit are selected based on matching requirements in each layer of the protocol stack specifications.

4. The system as claimed in claim 3, wherein the configurator builds a layered network of selected elements from the registry, the layered network comprising protocol graphs interconnecting the selected elements of different layers, and the candidate protocol stacks are derived from the protocol graphs in stages.

5. The system as claimed in claim 4, wherein the deriving of the candidate protocol stacks from the protocol graphs comprises prioritising the selected elements in the respective layers of the layered network.

6. The system as claimed in claim 4, wherein the protocol graphs reflect dependencies between the selected elements, and the deriving comprises selecting valid dependencies between elements.

7. The system as claimed in claims 1 or 2, wherein the configurator unit selects the candidate protocol stack for building and configuring the functional protocol stack based on synchronising sender and receiver available functional protocol stack.

8. The system as claimed in claims 1 or 2, wherein each connector element clones itself by maintaining existing connections to protocol components on an outer end of the connector element, splitting the connector element into two connector elements, and binding inner ends of the two connector elements to a new protocol component.

9. The system as claimed in claims 1 or 2, wherein each connector element is arranged to enable swapping of a protocol component to which the connector element is connected.

10. The system as claimed in claims 1 or 2, wherein the system is arranged such that the registry is maintained utilising auto-discovery of available protocol resources.

11. The system as claimed in claims 1 or 2, wherein each object-oriented element comprises associated data representing one or more of a group consisting of a name of the corresponding protocol component, properties of the corresponding protocol component, supported format of the corresponding protocol component, and propriety of the corresponding protocol component.

12. The system as claimed in claim 11, wherein search criteria for building the candidate protocol stacks comprises keywords for matching with the associated data of the respective object-oriented elements.

13. The system as claimed in claims 1 or 2, wherein the configurator unit is arranged for protocol stack specification during coding of applications, for configuration of protocol stacks during communication connections setup, and for on-the-fly reconfiguration of protocol stacks including adding, removing and swapping of protocol components.

14. The system as claimed in claims 1 or 2, wherein the protocol stack comprises a non-linear protocol stack for optimizing duplicated processing and/or for combining multiple linear protocol stack and sharing protocol components in multicast processes.

* * * * *